United States Patent
Akselrod et al.

(10) Patent No.: US 10,627,571 B1
(45) Date of Patent: Apr. 21, 2020

(54) PLASMONIC SURFACE-SCATTERING ELEMENTS AND METASURFACES FOR OPTICAL BEAM STEERING

(71) Applicant: Elwha, LLC, Bellevue, WA (US)

(72) Inventors: Gleb M. Akselrod, Bellevue, WA (US); Yuanmu Yang, Chonqing (CN); Patrick Bowen, Durham, NC (US)

(73) Assignee: Elwha, LLC, Bellevue, WA (US)

( * ) Notice: Subject to any disclaimer, the term of this patent is extended or adjusted under 35 U.S.C. 154(b) by 0 days.

(21) Appl. No.: 16/659,286

(22) Filed: Oct. 21, 2019

Related U.S. Application Data

(62) Division of application No. 15/924,744, filed on Mar. 19, 2018, now Pat. No. 10,451,800.

(51) Int. Cl.
| | |
|---|---|
| *G02B 6/122* | (2006.01) |
| *H01Q 3/26* | (2006.01) |
| *G02B 6/42* | (2006.01) |
| *G02B 6/293* | (2006.01) |

(52) U.S. Cl.
CPC ....... *G02B 6/1226* (2013.01); *G02B 6/29335* (2013.01); *G02B 6/42* (2013.01); *H01Q 3/2676* (2013.01)

(58) Field of Classification Search
CPC . G02B 6/1226; G02B 6/29335; H01Q 3/2676
See application file for complete search history.

(56) References Cited

U.S. PATENT DOCUMENTS

| | | | |
|---|---|---|---|
| 9,104,086 B1 | 8/2015 | Davids | |
| 9,195,052 B2* | 11/2015 | Long | G02F 1/0126 |
| 9,804,329 B2* | 10/2017 | Montazeri | H01L 31/054 |
| 9,935,375 B2 | 4/2018 | Bowers | |
| 10,451,800 B2* | 10/2019 | Akselrod | G02B 6/42 |

(Continued)

FOREIGN PATENT DOCUMENTS

| | | |
|---|---|---|
| JP | 2005345402 A | 12/2005 |
| WO | WO 2018-156688 | 8/2018 |

OTHER PUBLICATIONS

Huang et al., "Gate-tunable conducting oxide metasurfaces," Nano Lett. 16, 5319 (2016).

(Continued)

*Primary Examiner* — Daniel Petkovsek
(74) *Attorney, Agent, or Firm* — Phillips, Ryther & Winchester; Justin K. Flanagan

(57) ABSTRACT

Systems and methods are described herein for an optical beam-steering device that includes an optical transmitter and/or receiver to transmit and/or receive optical radiation from an optically reflective surface. An array of adjustable plasmonic resonant waveguides is arranged on the surface with inter-element spacings less than an optical operating wavelength. A controller applies a pattern of voltage differentials to the adjustable plasmonic resonant waveguides. The pattern of voltage differentials corresponds to a sub-wavelength reflection phase pattern for reflecting the optical electromagnetic radiation. One embodiment of an adjustable plasmonic resonant waveguide includes first and second metal rails extending from the surface. The metal rails are spaced from one another to form channel therebetween. An electrically-adjustable dielectric is disposed within the channel.

43 Claims, 22 Drawing Sheets

(56) References Cited

U.S. PATENT DOCUMENTS

| | | |
|---|---|---|
| 2004/0037497 A1 | 2/2004 | Lee |
| 2006/0239688 A1 | 10/2006 | Hillis |
| 2007/0018077 A1 | 1/2007 | Puscasu |
| 2009/0067774 A1* | 3/2009 | Magnusson ............ B82Y 20/00 385/10 |
| 2010/0001917 A1 | 1/2010 | Manasson |
| 2010/0156573 A1 | 6/2010 | Smith |
| 2012/0194399 A1 | 8/2012 | Bily |
| 2013/0129293 A1 | 5/2013 | Ogawa |
| 2013/0286633 A1 | 10/2013 | Rodriguez |
| 2014/0085693 A1* | 3/2014 | Mosallaei ............ G02B 1/002 359/107 |
| 2014/0266946 A1 | 9/2014 | Bily |
| 2014/0294338 A1 | 10/2014 | Long |
| 2015/0162658 A1* | 6/2015 | Bowers ............... H01Q 15/006 342/385 |
| 2015/0318618 A1 | 11/2015 | Chen |
| 2015/0318620 A1 | 11/2015 | Black |
| 2015/0372389 A1 | 12/2015 | Chen |
| 2015/0380828 A1 | 12/2015 | Black |
| 2016/0128193 A1 | 5/2016 | Elwha |
| 2017/0212285 A1 | 7/2017 | Arbabi |
| 2018/0138576 A1 | 5/2018 | Cohen |
| 2019/0243208 A1* | 8/2019 | Peng ........................ G02F 1/29 |

OTHER PUBLICATIONS

Pors, Bozhevolnyi, "Plasmonic metasurfaces for efficient phase control in reflection," Opt. Express 21, 27438 (2013).

Arbabi, Horie, Ball, Bagheri, and Faraon, "Subwavelength-thick lenses with high numerical apertures and large efficiency based on high contrast transmitarrays," Nat. Commun. 6, 1 (2014).

Haffner et al., "All-plasmonic Mach—Zehnder modulator enabling optical high-speed communication at the microscale." Nat. Photonics 9, 525-528 (2015).

Li et al., "Poling efficiency enhancement of tethered binary nonlinear optical chromophores for achieving an ultrahigh h3r33 figure-of-merit of 2601 pm V?1" J. Mater. Chem. C 3, 6737-6744 (2015).

Zhang et al., "High performance optical modulator based on electro-optic polymer filled silicon slot photonic crystal waveguide," J. Light. Technol. 34, 2941-2951 (2016).

Xing et al., "Digitally controlled phase shifter using an SOI slot waveguide with liquid crystal infiltration," 27, 1269-1272 (2015).

Borshch, Shiyanovskii, and Lavrentovich, "Nanosecond electro-optic switching of a liquid crystal," Phys. Rev. Lett. 111, 107802 (2013).

Chen et al., "Ultra-low viscosity liquid crystal materials," Opt. Mater. Express 5, 655 (2015).

Gholipour, Zhang, MacDonald, Hewak, and Zheludev, "An all-optical, non-volatile, bidirectional, phase-change meta-switch," Adv. Mater. 25, 3050 (2013).

Raoux, Xiong, Wuttig, and Pop, "Phase change materials and phase change memory," MRS Bull. 39, 703 (2014).

Ríos, et al., "Integrated all-photonic non-volatile multi-level memory," Nat. Photonics 9, 725 (2015).

PCT International Search Report; International App. No. PCT/US2019/022935; dated Jul. 4, 2019; pp. 1-5.

PCT International Search Report; International App. No. PCT/US2018/019107; dated Jun. 25, 2018; pp. 1-3.

Duo Wang et al. "A 60GHz Passive Repeater Array with Endfire Radiation Based on Metal Groove Unit-Cells" the 9th European Conference on Antennas and Propagation (EUCAP2015), Apr. 2015, Lisbon, Portugal. <hal-01121217>, Figs. 1-2, 5.

Akselrod, et al. U.S. Appl. No. 15/924,744, Notice of Allowance dated Jun. 5, 2019, pp. 1-14.

\* cited by examiner

PLASMONIC SURFACE-SCATTERING ELEMENTS AND METASURFACES FOR OPTICAL BEAM STEERING

PRIORITY APPLICATIONS

This Application is a divisional application of and claims priority to U.S. patent application Ser. No. 15/924,744, filed on Mar. 19, 2018, titled "Plasmonic Surface-Scattering Elements and Metasurfaces for Optical Beam Steering," which application will grant as U.S. Pat. No. 10,451,800 on Oct. 22, 2019 and is hereby incorporated by reference in its entirety.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, and for any and all parent, grandparent, great-grandparent, etc., applications of the Priority Application(s)). In addition, the present application is related to the "Related Applications," if any, listed below.

RELATED APPLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure relates to reconfigurable antenna technology. Specifically, this disclosure relates to reconfigurable reflective-type antenna elements operable at optical frequencies.

DETAILED DESCRIPTION

Figure 1A:
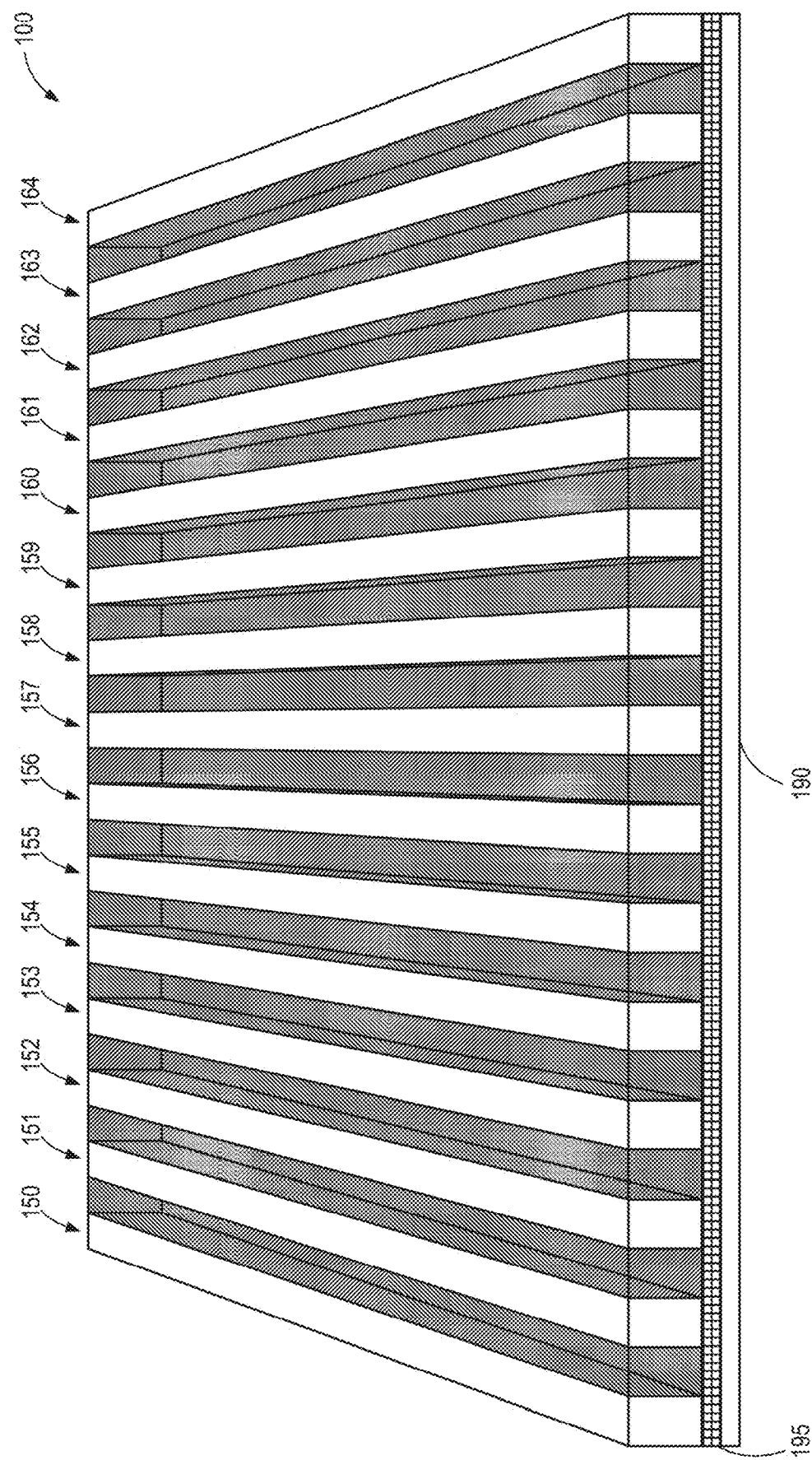
FIG. 1A illustrates a simplified embodiment of an optical surface scattering antenna device with adjustable plasmonic resonant waveguides.

In various embodiments, reconfigurable antennas leverage metamaterial surface antenna technology (MSAT). Metamaterial surface antennas, also known as surface scattering antennas and metasurface antennas, are described, for example, in U.S. Patent Publication No. 2012/0194399, which publication is hereby incorporated by reference in its entirety. Additional elements, applications, and features of surface scattering antennas that feature a reference wave or feed wave are described in U.S. Patent Publication Nos. 2014/0266946, 2015/0318618, 2015/0318620, 2015/0380828 and 2015/0372389, each of which is hereby incorporated by reference in its entirety. Examples of related systems that utilize a free-space reference or feed wave are described in, for example, U.S. Patent Publication No. 2015/0162658, which application is also hereby incorporated by reference in its entirety.

Systems and methods described herein utilize a free-space feed configuration to illuminate a reflective surface. The reflective surface is populated with adjustable plasmonic resonant waveguides. Throughout the disclosure, for each disclosed embodiment that involves illuminating a surface with a free-space reference wave to provide a reflecting outgoing or transmitted wave having a specific field pattern, a reciprocal embodiment is also contemplated that involves reflecting an incoming or received wave from the surface and then detecting the reflected wave according to the specific field pattern. More generally, antenna systems and methods described herein may be used to transmit and receive via the same device (transceive), transmit only, receive only, or transmit via one device and receive via a separate but similar device. For the sake of brevity, such devices and methods may be described as only transmitting or only receiving with the understanding that other combinations of receiving and/or transmitting are contemplated.

The presently described systems and methods operate at higher frequencies than many of the publications described above. Specifically, the systems and methods described herein operate in the infrared and/or visible-frequency ranges. As used herein, near-infrared, infrared, visible, and near ultraviolet frequencies may be generally referred to as "optical" frequencies and wavelengths. When operational frequencies are scaled up to optical frequencies, the sizes of the individual scattering elements and the spacings between adjacent scattering elements are proportionally scaled down to preserve the subwavelength (e.g., metamaterial) aspect of the technology. The relevant length scales for operation at optical frequencies may be on the order of microns or smaller. Generally, the feature sizes are smaller than typical length scales for conventional printed circuit board (PCB) processes. Accordingly, many of the embodiments of the present disclosure may be manufactured using micro-lithographic and/or nano-lithographic processes, such as complementary metal-oxide-semiconductor (CMOS) fabrication methods.

The present systems and methods utilize substantially different structures that many of the publications described above. Specifically, the systems and methods described herein relate to plasmonic interfaces of metals and dielectrics. Various applications of the optical surface scattering antennas described herein include, but are not limited to, imaging via light detection and ranging (LiDAR), imaging via structured illumination, free-space optical communication (e.g., single-beam and multiple-input-multiple-output (MIMO) configurations), and pointing and tracking for free-space optical communications.

In various embodiments, a reconfigurable antenna aperture is populated with adjustable plasmonic resonant waveguides. A surface plasmon is a non-radiative electromagnetic wave that travels at the interface between a material with a negative permittivity at optical frequencies (e.g., a plasmonic metal like gold, silver, platinum, aluminum, etc.) and a material with a positive permittivity at optical frequencies (e.g., a dielectric). Thus, an adjustable plasmonic resonant waveguide may be embodied as a dielectric with an adjustable permittivity sandwiched between two metal rails.

It is appreciated that the permittivity of the dielectric at optical frequencies is correlated with dielectric constant of the dielectric, which is also closely related to the refractive index of the dielectric at optical frequencies. Thus, modest changes in the refractive index of the dielectric of a high-Q plasmonic resonant waveguide result in a substantial shift in the resonant wavelength(s) of the high-Q plasmonic resonant waveguide. The higher the Q factor, the greater the shift in resonance for a given change in the dielectric constant.

Assuming a fixed frequency of operation near the resonance of the plasmonic resonant waveguides, a scattered field from the antenna system may vary in phase and/or amplitude as a function of the adjusted dielectric values of the individual plasmonic resonant waveguides. Although the phase and amplitude are correlated through the Lorentzian resonance, the phase of the field over the aperture may be used for holographic and/or beam-forming designs. The systems and methods described below allow for considerable control without additionally introduced phase-shifters.

The index modulation range of tunable dielectric material (e.g., an electrically-adjustable dielectric) is limited based on material selection. An antenna aperture with an array of tunable radiating or scattering elements may have high-Q, low-loss, subwavelength plasmonic resonant waveguides.

In various embodiments, tunable plasmonic resonant waveguide for scattering and/or radiating are described herein that have a relatively high-Q, are low-loss, and are sufficiently tunable to provide full or near-full phase control. As a specific example, a surface may be configured with a plurality of adjustable plasmonic resonant waveguides. The inter-element spacing of the adjustable plasmonic resonant waveguides may be less than, for example, an optical operating wavelength within an operational bandwidth. The surface may include an optically reflective surface to reflect optical electromagnetic radiation within the operational bandwidth.

In one embodiment, a plasmonic resonant waveguide may include a first metal rail extending from the surface and a second metal rail extending from the surface. The first and second metal rails may comprise one or more combinations of metals that support surface plasmons, such as silver, gold, and/or aluminum. Other plasmonic metals, such as copper, titanium, and/or chromium, may be used in some instances. An electrically-adjustable dielectric, may be disposed in a channel between the first and second metal rails to form an adjustable plasmonic resonant waveguide. The adjustable plasmonic resonant waveguide can be tuned or adjusted by varying a voltage applied to the electrically-adjustable dielectric.

Each of the metal rails may have a length that is greater than a width. The length of each elongated rail may also be greater than a height to which each metal rail extends from the surface. The width of each elongated metal rail may less than, equal to, or greater than the height depending on the specific configuration. The elongated metal rails may extend perpendicular to the surface or at an angle relative to the surface. As per the subsequently described illustrations, the elongated metal rails may appear as walls or ridges running between two ends or edges of the surface. A first metal rail may be substantially parallel to a second metal rail and the electrically-adjustable dielectric may be disposed within a channel defined by the first and second metal rails.

As previously described, each adjustable plasmonic resonant waveguide may include first and second metal rails extending from the surface to a height H. Each of the metal rails may have a width W and a length L, where the length L may be much greater than the height H and/or the width W. Each plasmonic resonant waveguide may be defined by two substantially parallel metal rails that are substantially parallel to one another and spaced apart by a channel width C. An electrically-adjustable dielectric may be disposed within the channel. In some embodiments, the electrically-adjustable dielectric may fill the channel to the tops of the metal rails and in other embodiments the electrically-adjustable dielectric may only partially fill the channel.

A variable voltage differential may be applied (e.g., via a controller) to the first and second metal rails of each of the adjustable plasmonic resonant waveguides. The dielectric constant of the electrically-adjustable dielectric may be varied based on an applied voltage differential. Each voltage differential may correspond to a different dielectric constant and associated refractive index, and each dielectric constant or refractive index may correspond to a unique reflection phase of each individual adjustable plasmonic resonant waveguide.

In various embodiments, the surface may comprise an optically reflective and electrically conductive surface, such as a metal surface. As a specific example, the surface comprises a layer of copper separated from the metal rails by an insulating layer. In another example, elongated patches of copper may extend beneath one or more channels of each adjustable plasmonic resonant waveguide. The optically reflective surface may be positioned beneath or embedded within a substrate. The substrate may be optically transparent or absorb most of the energy at wavelengths within the operational bandwidth. In some embodiments, the substrate may be substantially covered with a reflective metal. The material may depend on the operational bandwidth and/or other desired properties of reflectivity. Examples of suitable metals for various operational bandwidths include copper, silver, gold, nickel, iridium, aluminum, etc.

In some embodiments, reflective patches or reflective coatings on the substrate may be formed as high-reflective patches or coatings with more than one layer of material (e.g., a first layer with a high index of refraction and a second layer with a low index of refraction). For example, the surface may comprise alternating layers of dielectrics having high and low indices of refraction. Such a reflector may be configured as or referred to as a Bragg reflector.

As previously noted, the surface may comprise a substrate entirely covered with a reflective material as a layer. In other embodiments, the surface may comprise a substrate that includes the reflective material as an embedded layer. In other embodiments, a patch of reflective material with dimensions corresponding to the dimensions of an adjustable plasmonic resonant waveguide is positioned substantially beneath each of the adjustable plasmonic resonant waveguides. In some embodiments, a non-conductive layer (e.g., silicon dioxide) may separate the reflective patch or layer (which may be electrically conductive) from the metal rails and the electrically-adjustable dielectric.

The arrangement of adjustable plasmonic resonant waveguide on the surface may be described as a metasurface with each adjustable plasmonic resonant waveguide functioning as a metamaterial device with sub-wavelength proportions relative to the operational bandwidth. Accordingly, the inter-element spacing between adjacent adjustable plasmonic resonant waveguide is generally less than one wavelength of a smallest wavelength within the operational bandwidth (e.g., three-quarters of a wavelength or one-half of a wavelength). In some embodiments, the inter-element spacing may be significantly less than one-half wavelength (e.g., one-fifth, one-tenth, or even less).

The adjustable plasmonic resonant waveguides may be arranged in a one-dimensional array defined perpendicular to the length of each of the adjustable plasmonic resonant waveguides. As previously described, the adjustable plasmonic resonant waveguides may be elongated to extend from one end or edge of the surface to another end or edge of the surface. In some embodiments, the one-dimensional array of elongated adjustable plasmonic resonant waveguides may be formed on a surface without one or both ends of each adjustable plasmonic resonant waveguide extending to the edge of the surface. That is, the one-dimensional array of adjustable plasmonic resonant waveguides may be positioned on a surface having greater dimensions that the length of each adjustable plasmonic resonant waveguide and/or the total width of the array of adjustable plasmonic resonant waveguide.

In some embodiments, substantially elongated metal rails may be arranged substantially parallel to one another with substantially uniform spacing and the electrically-adjustable dielectric may be disposed within each of the channels defined by adjacent metal rails. In such an embodiment, many of the adjustable plasmonic resonant waveguides may share a metal rail with an adjacent adjustable plasmonic resonant waveguide.

The resonance of an adjustable plasmonic resonant waveguide may depend, at least in part, on the height, width, and/or length of the metal rails. Accordingly, one or more of the dimensions of the metal rails may be selected to attain a target operational bandwidth, target resonance bandwidth, target Q factor for the adjustable plasmonic resonant waveguide, and/or other target functionality.

To provide a specific example, an elongated metal rail may extend from the surface to a height of between approximately 300 and 1500 nanometers. For example, the elongated metal rails may extend from the surface to a height of 400 nanometers for an embodiment that includes an operational wavelength of 905 nanometers. In another embodiment, the elongated metal rails may extend from the surface to a height of 600 nanometers for an embodiment that includes an operational wavelength of 905 nanometers. For an operational bandwidth that includes longer wavelengths (e.g., 1550 nanometers), the elongated metal rails may extend from the surface to a height of approximately 700 or 1050 nanometers for second or third order harmonic embodiments, respectively. In still other embodiments, walls elongated metal rails exceeding 1500 nanometers may be used. The exact height of the elongated walls may be adapted for a particular frequency or frequency band and/or to attain various target resonant characteristics as discussed below.

Each of the elongated metal rails may have a width between approximately 50 and 300 nanometers. As an example, each of the elongated metal rails may have a width of approximately 150 nanometers. Each elongated metal rail may be spaced from adjacent elongated metal rail(s) by a channel spacing or channel width of between 100 and 200 nanometers. In various embodiments, the spacing between elongated metal rails may be uniform, patterned, random, or pseudorandom.

As described herein, adjustable plasmonic resonant waveguides may share metal rails. Thus, the interelement spacing, or pitch, of the adjustable plasmonic resonant waveguides may be described as the distance between the center of a channel of a first adjustable plasmonic resonant waveguide and the center of a channel of a second adjustable plasmonic resonant waveguide. In embodiments in which the widths of the channels and plasmonic metal rails are uniform, the interelement spacing or pitch may be equal to the combined width of the channel and a single plasmonic metal rail.

In the one example, adjustable plasmonic resonant waveguides at the ends of a row of adjustable plasmonic resonant waveguide (i.e., a one-dimensional array of adjustable plasmonic resonant waveguide) share only one elongated metal rail while all of the other adjustable plasmonic resonant waveguide share both elongated metal rails with adjacent adjustable plasmonic resonant waveguides on either side. In such an embodiment, 100 elongated metal rails arranged substantially parallel to one another may form 99 adjustable plasmonic resonant waveguides in a one-dimensional array.

The height and width dimensions of each of the elongated metal rails may be based on a target resonance and/or Q factor for a wavelength or wavelengths within the operational bandwidth. The total number of adjustable plasmonic resonant waveguides and the length of the metal rails in each of the adjustable plasmonic resonant waveguides may be selected to attain a target reflection surface for the antenna device.

While the above-described embodiments contemplate a one-dimensional array of elongated metal rails on a surface, in some embodiments, the elongated walls may be arranged in any number of columns having any number of rows to form an M×N array of adjustable plasmonic resonant waveguides. A control system may include a matrix of circuitry to selectively address each of the adjustable plasmonic resonant waveguides to supply a voltage differential between paired elongated metal rails. In still other embodiments, the elongated metal rails may be arranged in concentric rings or as concentric sides of a polygon. For example, the elongated metal rails may be curved, such that the concentric rings are circular. Alternatively, the elongated metal rails may be straight and arranged as concentric sides of a polygon such as a hexagon, octagon, or the like.

In some embodiments, the elongated metal rails may have substantially rectangular bases, but the sides may be flared in (or out) slightly. Defects in manufacturing or quantifiable or expected artifacts of manufacturing may result in metal rails and/or channels that are not perfectly rectangular without departing from the scope and functionality of the presently described embodiments. For example, metal rails may have planar walls, bases, or tops, or alternatively they may be slightly convex or concave without deviating from the scope of the presently described embodiments.

In some embodiments, the base of each metal rail may be slightly larger or smaller than the top of each metal rail, such that each metal rail may be shaped like an elongated and truncated pyramid or an inverted elongated and truncated pyramid. Such variations in shape may, in some instances, be a product of manufacturing or etching. For example, an attempt to create rectangular bases using chemical or physical etching may result in slightly malformed shapes with rounded edges and bases and tops that may not have the same area as bases.

Adjustable plasmonic resonant waveguides may be configured to have a resonance and a Q factor selected for a particular frequency band and based on the electrically-adjustable dielectric disposed within the channels. Each of the plurality of adjustable plasmonic resonant waveguides may be configured to be "high-Q" with a Q factor between approximately 5 and 100. For instance, each of the plurality of adjustable plasmonic resonant waveguides may have a Q factor between approximately 10 and 30. In one specific embodiment, each of the plurality of adjustable plasmonic resonant waveguide has a Q factor of approximately 20.

As previously described, the elongated metal rails may be spaced by a channel width corresponding to the fundamental harmonic mode of the frequencies within an optical operating bandwidth. In such an embodiment, one antinode can be realized in the channel width. The height of the metal rails may correspond to the fundamental harmonic mode as well, such that the number of magnetic field antinodes within the channel is 1 multiplied by the number of magnetic field antinodes that can be realized along the length of the channel.

Alternatively, the height of the metal rails may be selected to correspond to the second order harmonic mode, such that two magnetic field antinodes can be realized within the channel between the surface and the tops of the metal rails. In such an embodiment, the number of magnetic field antinodes that can be realized within a single adjustable plasmonic resonant waveguide is equal to 2 multiplied by the number of magnetic field antinodes that can be realized along the length of the channel. With a wider channel that accommodates two magnetic field antinodes, the number of magnetic field antinodes that can be realized within a single adjustable plasmonic resonant waveguide is equal to 4 multiplied by the number of magnetic field antinodes that can be realized along the length of the channel. Thus, the total number of magnetic field antinodes that can be formed within the electrically-adjustable dielectric between the two metal rails of each adjustable plasmonic resonant waveguide is a function of (i) the channel width, (ii) the vertical height from the surface, and (iii) the length of the metal rails. Any combination of heights, channel widths, and lengths can be selected to attain fundamental, second order, third order . . . etc. harmonic modes in the given dimension.

In various embodiments, the phase of the reflected electromagnetic radiation (e.g., optical radiation) is dependent on the refractive index of the electrically-adjustable dielectric disposed between pairs of metal rails. The refractive index and associated permittivity and dielectric constant of the electrically-adjustable dielectric is dynamically selectable and adjustable based on a bias voltage applied to one or both metal rails to create a voltage difference across the electrically-adjustable dielectric.

A controller may be used to selectively apply voltage differentials to the individual or groups of adjustable plasmonic resonant waveguides in an array. A pattern of voltage differentials applied to an array of adjustable plasmonic resonant waveguides corresponds to a pattern of indices of refraction of the adjustable plasmonic resonant waveguides, which in turn corresponds to a pattern of reflection phases of the adjustable plasmonic resonant waveguides. Due to the subwavelength spacing and element sizes of the adjustable plasmonic resonant waveguides, a pattern of reflection phases of the adjustable plasmonic resonant waveguides corresponds to a specific reflection pattern of incident optical radiation.

Thus, a set of patterns of applied voltage differentials corresponds to a set of reflection patterns of incident optical radiations. An applied voltage differential pattern can be determined for optical beamforming in both transmit and receive applications. A target beamform can be attained by applying a determinable pattern of voltage differentials to the individual or groups of adjustable plasmonic resonant waveguides.

An example of a suitable electrically-adjustable dielectric is liquid crystal. In one specific embodiment, a voltage differential can be varied between a first (low) voltage and a second (higher) voltage to vary the index of refraction of the liquid crystal by approximately ten percent. Another suitable electrically-adjustable dielectric for some applications is an electro-optic polymer. Electro-optic (EO) polymer materials exhibit a refractive index change based on second order polarizability, known as the Pockels effect, where the index modulation is proportional to the applied static or radio frequency electric field. These materials are typically small molecule organics doped into a polymer host, which results in excellent solution processability. The index modulation is given by $$\Delta n = \frac{1}{2} n^3 r_{33} E \qquad \text{Equation 1}$$

In Equation 1, n is the linear refractive index, E is the applied electric field and $r_{33}$ is the Pockels coefficient. Since the electric field is limited by dielectric breakdown, the goal of synthetic chemistry and materials development is to increase the Pockels coefficient. State-of-the-art materials have Pockels coefficients of ~150 pm/V, resulting in a performance of Δn/n of approximately 2%. More exotic and recently-developed chemistries have resulted in electro-optical polymers which could potentially achieve index modulation as large as 6%. Since the effect is due to a nonlinear polarizability, the response time of electro-optical polymers is extremely fast (several fs), resulting in device modulation speeds of >40 GHz. Due to their large nonlinear coefficients compared with electro-optic crystalline materials, such as lithium niobate, electro-optical polymers may be used as modulators, enabling high-density photonic integrated circuits.

A number of companies have commercialized the synthesis of electro-optical materials and their integration into Mach-Zender modulators, such as Lightwave Logic and Soluxra. As a result, many challenges associated with electro-optical polymers have been addressed, such as thermal stability, long-term operation, and the efficient poling (orientation) of the nonlinear molecules along the electric field direction. As a result, electro-optical materials can be used as the electrically-adjustable dielectric in some applications. In some approaches, electro-optical polymers may be suitable for applications where MHz and GHz rate switching may be desired, such as LiDAR single-beam scanning and structured illumination, or free-space optical communications with holograms that simultaneously perform beamforming and data encoding (thus allowing multi-user MIMO schemes).

As previously noted, liquid crystals may be used as an electrically-adjustable dielectric. Liquid crystals are a wide class of organic materials that exhibit anisotropy in the refractive index, which depends on molecular orientation and is controlled with an alternating current electric field. In the widely-used nematic liquid crystals, modulation between the extraordinary and ordinary refractive index can be up to 13%, exceeding the performance of electro-optical polymers. However, because the index modulation occurs due to physical reorientation of the entire molecule, the switching times in typical liquid crystal devices such as displays are relatively slow (~10 millisecond), limited by the rotational viscosity and the elastic constant of the liquid.

As compared to micro-scale displays, the switching time of liquid crystals can be significantly reduced in geometries with smaller electrode spacing and materials optimized for low viscosity, such that microsecond switching times are possible in metasurface structures. The switching time is mostly limited by the on-to-off transition due to elastic relaxation, and consequently device geometries employing orthogonal electrodes can reduce the switching times even further.

The ubiquity of liquid crystal materials, their industrial production, and their robustness are major advantages of liquid crystals for use with dynamic optical metasurfaces. In some approaches, a liquid crystal material having a relatively low switching speed may be suitable to provide dynamic holograms for free-space optical communications, where the optical beam may be steered on the time scale of transmitter and receiver motion and vibration, typically on the millisecond timescale. In other approaches, a liquid crystal material having a relatively high switching speed (e.g. as enhanced by the use of low viscosity liquid crystals and/or counter-electrode geometries) may be suitable for scanning LiDAR and/or computational imaging based on structured illumination where MHz speeds may be desired.

In still other embodiments, one or more types of chalcogenide glasses may be used as the electrically-adjustable dielectric. Chalcogenide glasses have a unique structural phase transition from the crystalline to the amorphous phase—which have significantly different electrical and optical properties—with index modulation in the shortwave infrared spectrum of over 30%.

The phase transition of chalcogenide glasses is thermally induced and may be achieved through direct electrical heating of the chalcogenide. One example is $Ge_2Sb_2Te_5$ (GST), which becomes crystalline at ~200° C. and can be switched back to the amorphous state with a melt-quenching temperature of ~500° C. In addition to the large index modulation between these two states (~30%), another attractive feature is that the material state is maintained in the absence of any additional electrical stimulus. For this reason, GST may be used in non-volatile electronic memory and has also been demonstrated as a constituent of all-optical memory.

In some approaches, a chalcogenide glass material may be suitable for applications where it is desired to only occasionally reconfigure the metasurface and yet provide good thermal stability and environmental stability. For example, in free-space optical links, gradual drift of the transmitter or receiver may be compensated by low duty-cycle changes to the beam-pointing direction. At the same time, the large index modulation in these materials allows for the use of lower-Q resonators, simplifying design and easing fabrication tolerances.

The various metasurface architectures described herein may be fabricated using standard CMOS-compatible materials and processes. For example, a metal reflector may be made from various CMOS-compatible metals such as aluminum or copper, without sacrificing performance. In the embodiments described herein, the minimum feature size is about 100 nanometers, well within the limits of deep UV lithography. For example, 40-nanometer node technology is now a commodity process offered by many CMOS foundries, while custom foundry services offered by Intel operate at the 14-nanometer node. Furthermore, several foundries have recently been established that focus specifically on photonic-electronic integration, such as AIM Photonics.

As previously described, the feature sizes of the adjustable plasmonic resonant waveguides may be varied for an operational bandwidth that includes a portion of the visible light spectrum, the infrared spectrum, the near-infrared spectrum, the short-wavelength infrared spectrum, the medium-wavelength infrared spectrum, the long-wavelength infrared spectrum, the far infrared spectrum, and various telecommunications wavelengths like microwaves and beyond. In some embodiments, an array of adjustable plasmonic resonant waveguides may include a first set of elements for a first frequency band and a second set of elements for a second frequency band. One set or the other may be utilized depending on which frequency band is operational at a given time. In other embodiments, both sets of elements may be used simultaneously. Multiple sets of elements may be used for multiple frequency bands.

A transmitter may transmit optical radiation to the reflective surface. The reflective surface may reflect the transmitted optical radiation according to a reflection pattern (e.g., beamformed) based on a voltage differential pattern applied to the array of adjustable plasmonic resonant waveguides. Similarly, incident beamformed optical radiation may be received by the array of adjustable plasmonic resonant waveguides based on the applied voltage differential pattern. The received beamformed optical radiation may be reflected to a receiver. In some embodiments, a first array of adjustable plasmonic resonant waveguides may be used for transmitting and a second array of adjustable plasmonic resonant waveguides may be used for receiving. In other embodiments, a single array of adjustable plasmonic resonant waveguides may be shared for both receiving and transmitting.

The control functionality of the adjustable plasmonic resonant waveguides may be similar to the control of other metamaterial devices and metasurfaces. By controlling the phase (e.g., reflection phase) of individual subwavelength elements, beamforming can be accomplished. Controlling the individual elements may be accomplished by calculation, optimization, lookup tables, and/or trial and error. The disclosures referenced above and incorporated herein by reference provide some suitable examples for controlling individual elements. Other approaches known in the art may be utilized as well. In fact, many existing computing devices and infrastructures may be used in combination with the presently described systems and methods.

Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific control function.

It is also appreciated that two or more of the elements, devices, systems, subsystems, components, modules, etc. that are described herein may be combined as a single element, device, system, subsystem, module, or component. Moreover, many of the elements, devices, systems, subsystems, components, and modules may be duplicated or further divided into discrete elements, devices, systems, subsystems, components or modules to perform subtasks of those described herein. Any of the embodiments described herein may be combined with any combination of other embodiments described herein. The various permutations and combinations of embodiments are contemplated to the extent that they do not contradict one another.

As used herein, a computing device, system, subsystem, module, or controller may include a processor, such as a microprocessor, a microcontroller, logic circuitry, or the like. A processor may include one or more special-purpose processing devices, such as application-specific integrated circuits (ASICs), programmable array logic (PAL), programmable logic array (PLA), programmable logic device (PLD), field-programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented or enhanced using hardware, software, firmware, or a combination thereof.

The components of some of the disclosed embodiments are described and illustrated in the figures herein. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once. As previously noted, descriptions and variations described in terms of transmitters are equally applicable to receivers, and vice versa.

FIG. 1A illustrates a simplified embodiment of an optical surface scattering antenna device 100 with a plurality of elongated, plasmonic metal rails 150-164 (white rectangular prisms). An electrically-adjustable dielectric (shown in grey) is shown within the channels between the elongated metal rails 150-164. An insulator 195 insulates the elongated metal rails 150-164 from an underlying reflector 190. In the illustrated embodiment, the insulator 195 and the reflector 190 may constitute a surface from which the elongated metal rails 150 extend. In the illustrated embodiment, the elongated metal rails 150-164 are elongated from one end or edge of the surface 190 and 195 to the other. In alternative embodiments, the insulator 195 and/or reflector 190 may extend further than the elongated metal rails 150-164.

Figure 1B:
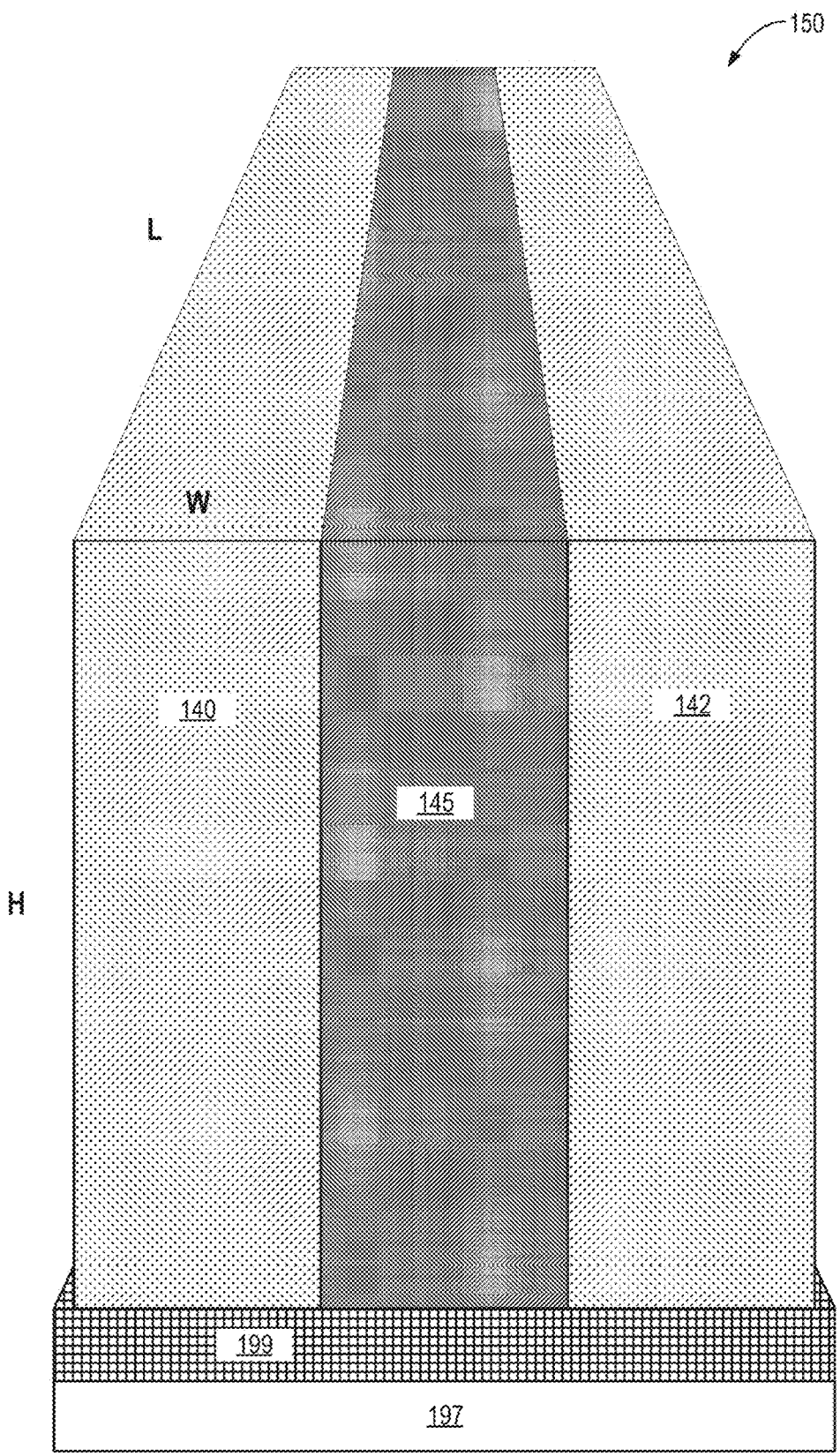
FIG. 1B illustrates an example of single adjustable plasmonic resonant waveguide extending from a surface with an insulator and reflector.

FIG. 1B illustrates an example of single, subwavelength, adjustable plasmonic resonant waveguide 150 extending from a surface that includes an optical reflector 197 and an insulator 199. As illustrated, the adjustable plasmonic resonant waveguide 150 comprises a first elongated metal rail 140 that extends up to a height H from the insulator 199 with a defined width W and length L.

As described in conjunction with FIG. 1A, the elongated metal rail 140 may extend between edges of the underlying surface and/or at least be several times longer than it is wide. A second opposing elongated metal rail 142 is substantially parallel to the first elongated metal rail 140. The first and second metal rails 140 and 142 may comprise one or more combinations of metals that support surface plasmons, such as silver, gold, and/or aluminum, and may thus be referred to as plasmonic metal rails. Other plasmonic metals, such as copper, titanium, and/or chromium, may be used in some embodiments.

An electrically-adjustable (e.g., tunable) dielectric 145 is disposed within a channel between the first 140 and second 142 metal rails. In some embodiments, the dielectric 145 may be disposed all around the first 140 and second 142 metal rails, but it is at least disposed within the channel between the first 140 and second 142 metal rails. In some embodiments, the insulator 199 may comprise silicon dioxide and the electrically-adjustable dielectric 145 may comprise liquid crystal. In other embodiments, the insulator 199 and the electrically-adjustable dielectric 145 may be the same material and/or even formed as a single component.

The width W and height H of the first 140 and second 142 metal rails may be selected to attain a specific resonant frequency tuning. Furthermore, the spacing (i.e., width of the channel) between the first 140 and second 142 metal rails and the height H of each of the first 140 and second 142 metal rails may be selected to correspond to a fundamental harmonic mode, a second order harmonic mode, etc. The dimensions can be selected to attain a target number of magnetic field antinodes between the first 140 and second 142 metal rails across the width of the channel and along the height of the channel. Similar dimension selections may be made with respect to the length of the first 140 and second 142 metal rails.

As previously described, the electric rails 140 and 142, the reflector 197, the insulator 199 and/or the dielectric 145 may be formed as part of or in conjunction with chemical etching, bonding, micro-lithographic processes, nano-lithographic processes, CMOS lithography, PECVD, reactive ion etching, electron beam etching, sputtering, and/or the like.

As previously noted, the electrically-adjustable dielectric 145 may comprise liquid crystal. In other embodiments, the electrically-adjustable dielectric 145 may comprise one or more of an electro-optic polymer, liquid crystals, a chalcogenide glass, and/or silicon. Each of these materials may have a static or quasi-static index of refraction for an operational bandwidth (i.e., an optical operational bandwidth). However, by applying a voltage to one or both of the first 140 and second 142 metal rails, a voltage differential between the two metal rails 140 and 142 can subject the electrically-adjustable dielectric 145 to an electric field.

A material for the electrically-adjustable dielectric 145 may be selected based on a desired tuning mechanism, refractive index modulation (shown as a percentage below), and typical frequency response. Example values of four general categories of material are shown below in Table 1. It is, however, appreciated that different values may be attained based on the specific species or properties of a given material.

| Material | Tuning Mechanism | Typical Δn/n | Typical Frequency |
|---|---|---|---|
| Electro-Optic Polymers | Pockels Effect | ≈2-4% | >10 GHz |
| Liquid Crystals | Tunable Birefringence | ≈13% | ≈100 Hz |
| Chalcogenide Glasses | Phase Change | ≈30% | ≈100 MHz |
| Silicon | Thermo-Optic Effect | ≈0.3% | ≈kHz-MHz |

Many materials considerations and tradeoffs may be considered in the selection of the tunable material. One material parameter is the relative refractive index modulation (Δn/n), which is highly correlated with the achievable local phase shift of the element. Materials with larger index modulations allow for larger phase shifts for a given resonance Q factor. To achieve full phase modulation, the resonance Q factor of the element may be Q>n/Δn. In general, there is a tradeoff between index modulation and response speed of the material. Materials with the largest index modulation of ~30%—such as liquid crystals—typically have response rates on the order of ~100 Hz, while electro-optic polymers, based on the Pockels effect, typically have index modulation of 6% or less, but with GHz response rates. At the same time, the material should have low optical absorption at the operating wavelength if phase holograms with high efficiency are desired.

Figure 1C:
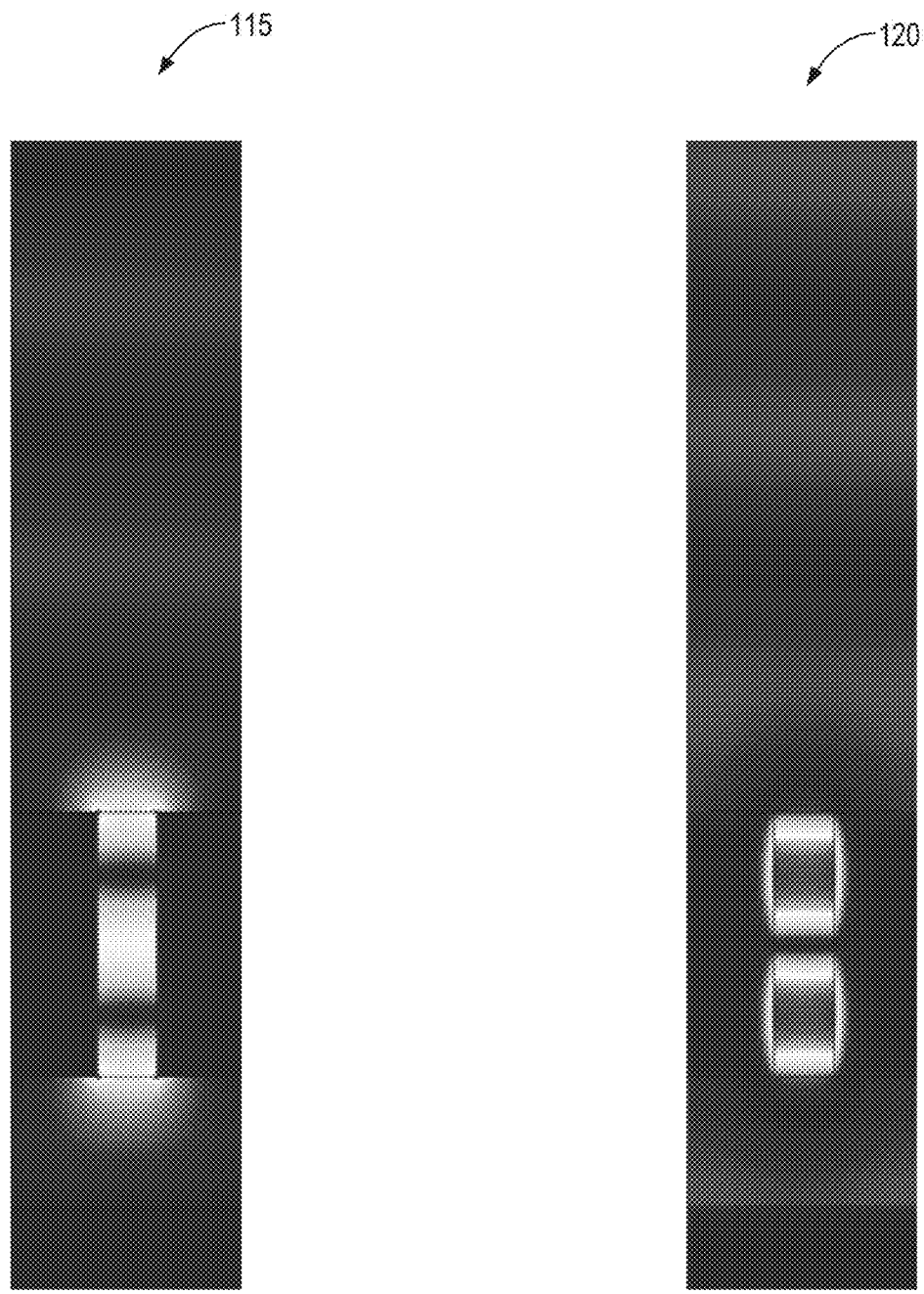
FIG. 1C illustrates conceptual representations of the electric and magnetic energy densities within the adjustable plasmonic resonant waveguide of FIG. 1B with optical excitation at approximately 70° relative to normal with transverse magnetic (TM) polarization.

FIG. 1C illustrates conceptual representations of the electric 115 and magnetic 120 energy densities, respectively, within the adjustable plasmonic resonant waveguide of FIG. 1B with excitation of an optical wavelength at a grazing incidence angle of approximately 70-80° relative to normal with transverse magnetic (TM) polarization. Examples of possible wavelengths include, for example, optical wavelengths of approximately 905 nanometers or 1,550 nanometers. A wide variety of specific wavelengths and/or bands of wavelengths could be used with similar effect.

The interface of the metal rails with the electrically-adjustable dielectric allows for a plasmonic transmission of a non-radiative electromagnetic wave between the upper portion of each adjustable plasmonic resonant waveguide and the surface (specifically the reflector). The permittivity of the electrically-adjustable dielectric can be dynamically modulated based on the voltage differential applied to the metal rails on either side of the channel. As illustrated, under the grazing incidence excitation, the electric field 115 and the magnetic field 120 are strongly localized in the electrically-adjustable dielectric 145 between the first 140 and second 142 metal rails.

Figure 2A:
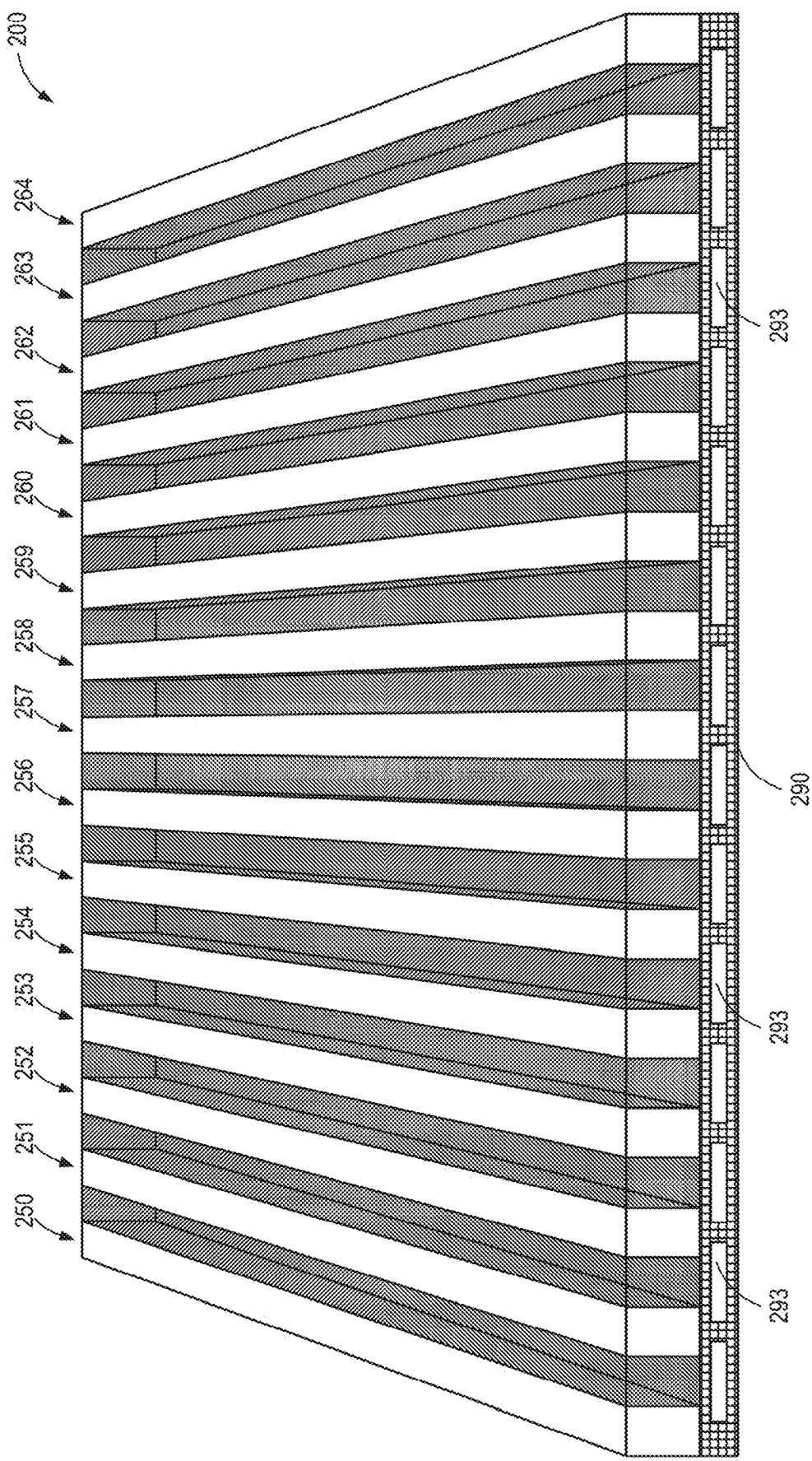
FIG. 2A illustrates a simplified embodiment of an optical surface scattering antenna device with reflector patches beneath each of the adjustable plasmonic resonant waveguides.

FIG. 2A illustrates an alternative, simplified embodiment of an optical surface scattering antenna device 200 with a plurality of elongated, plasmonic metal rails 250-264 forming channels within which an electrically-adjustable dielectric is disposed. The surface from which the elongated metal rails 250-264 extends includes an insulator 290 within which a plurality of reflector patches 293 are embedded (only a few of which are labeled to avoid obscuring the drawing). In the illustrated embodiment, a single reflector patch 293 underlies each channel of the plurality of adjustable plasmonic resonant waveguides. The embedded reflector patches 293 may be elongated to run the length of each of the channels between the elongated metal rails 250-264. Thus, the reflector patches 293 may be elongated reflector patches having a length that corresponds to the length of the elongated metal rails 250-264 and associated channels.

Figure 2B:
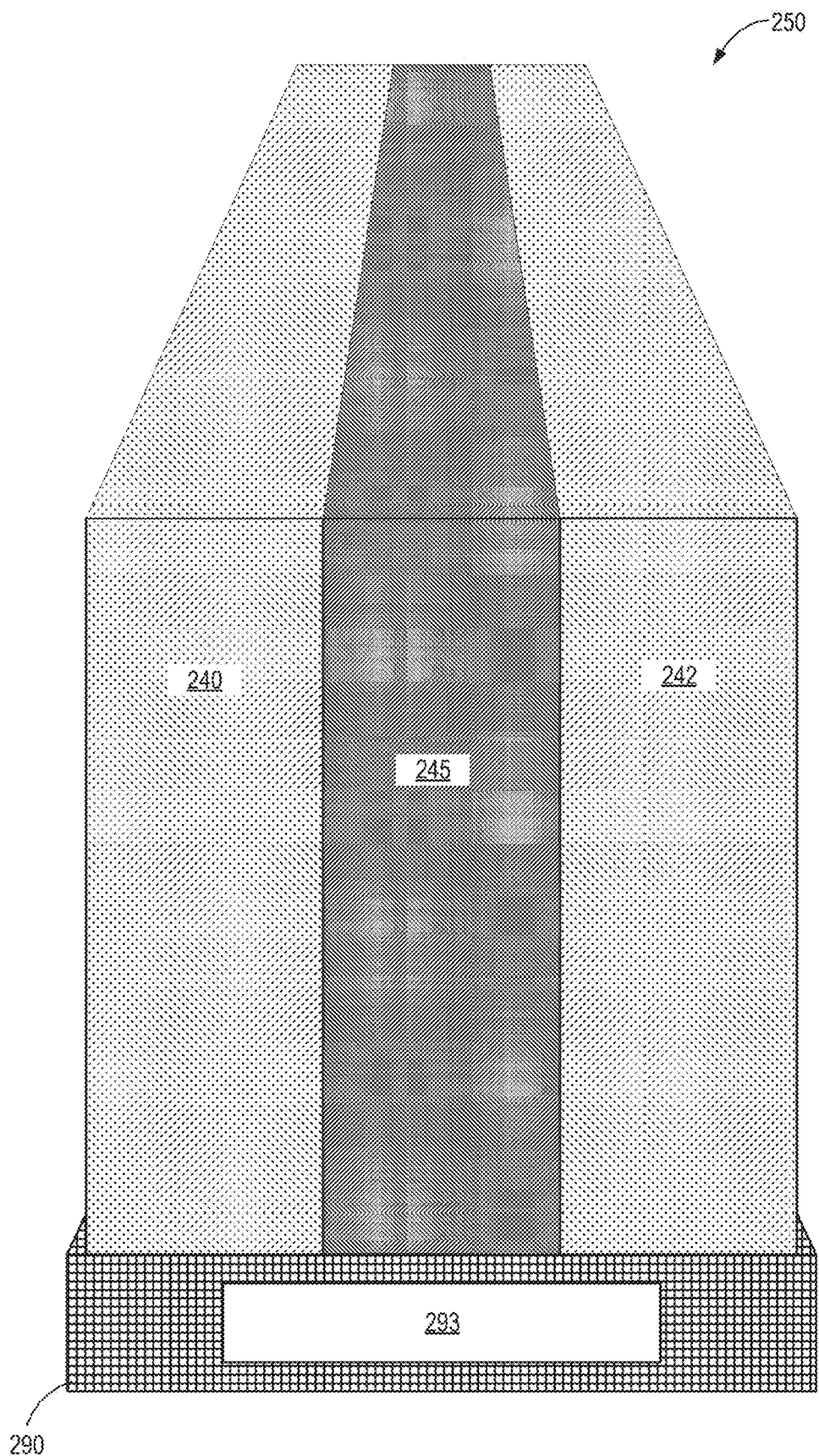
FIG. 2B illustrates an example of single adjustable plasmonic resonant waveguide extending from a surface with an insulator and embedded reflector patches.

FIG. 2B illustrates an example of single, subwavelength, adjustable plasmonic resonant waveguide 250 extending from a surface that includes an elongated optical reflector patch 293 embedded within an insulator 290. As illustrated, the adjustable plasmonic resonant waveguide 250 comprises a first elongated metal rail 240 and a second opposing elongated metal rail 242 is substantially parallel to the first elongated metal rail 240. The first and second metal rails 240 and 242 may comprise one or more combinations of metals that support surface plasmons, such as silver, gold, and/or aluminum, copper, titanium, and/or chromium.

As in previously described embodiments, an electrically-adjustable dielectric 245 is disposed within a channel between the first 240 and second 242 metal rails. As previously noted, the electrically-adjustable dielectric 245 may comprise liquid crystal. In other embodiments, the electrically-adjustable dielectric 245 may comprise one or more of an electro-optic polymer, liquid crystals, a chalcogenide glass, and/or silicon. In various embodiment, the embedded reflector patch 293 may reflect optical electromagnetic radiation from the adjustable plasmonic resonant waveguide formed by the first 240 and second 242 metal rails and the electrically-adjustable dielectric disposed within the channel formed therebetween.

Figure 2C:
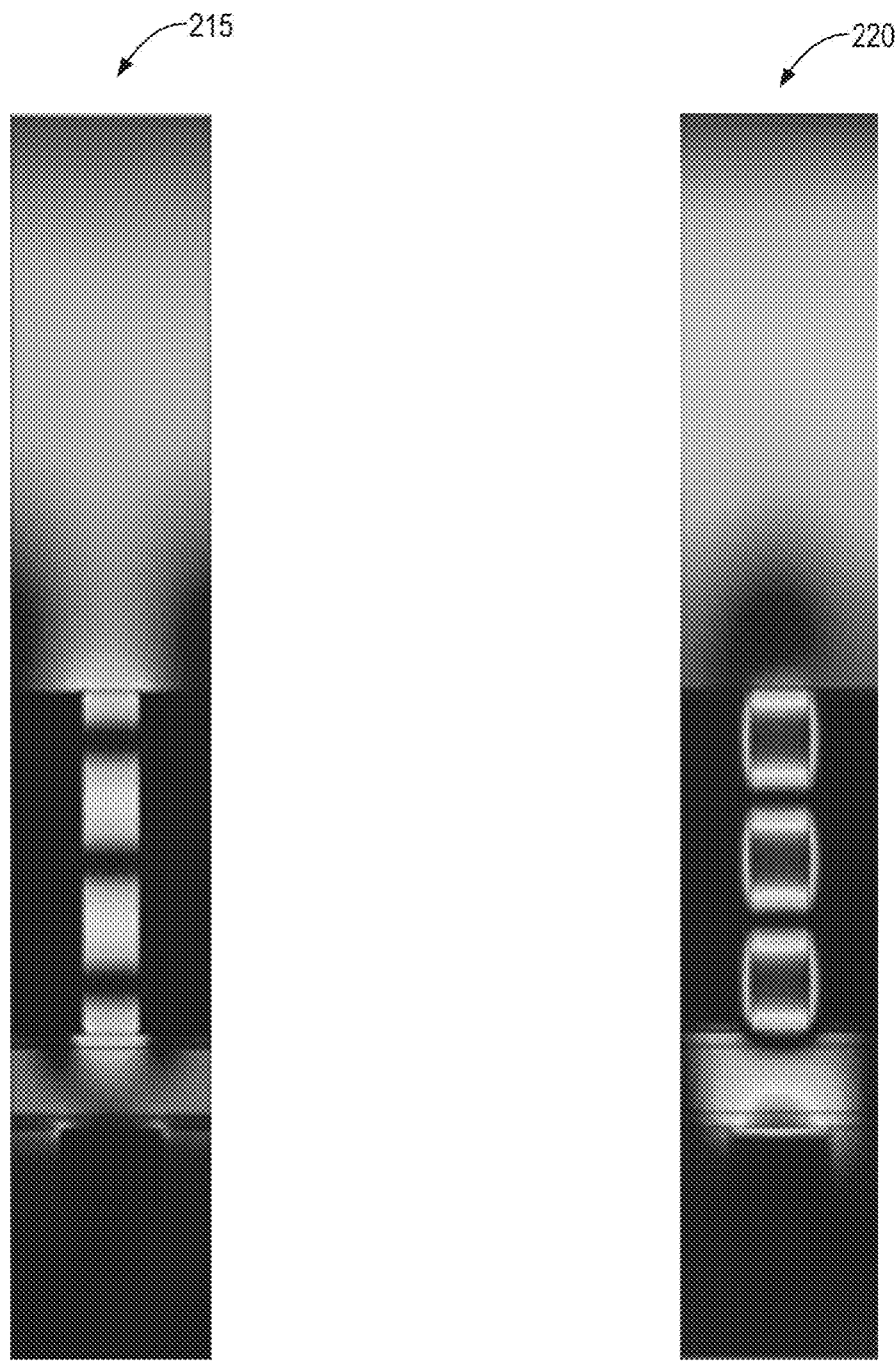
FIG. 2C illustrates conceptual representations of the electric and magnetic energy densities within the adjustable plasmonic resonant waveguide of FIG. 2B.

FIG. 2C illustrates conceptual representations of the electric 215 and magnetic 220 energy densities, respectively, within the adjustable plasmonic resonant waveguide of FIG. 2B with excitation of an optical wavelength at a grazing incidence angle of approximately 70-80° relative to normal with transverse magnetic (TM) polarization. The interface of the metal rails with the electrically-adjustable dielectric allows for a plasmonic transmission of a non-radiative electromagnetic wave between the upper portion of each adjustable plasmonic resonant waveguide and the reflector patch. As previously described, the permittivity of the electrically-adjustable dielectric can be dynamically modulated based on the voltage differential applied to the metal rails on either side of the channel. The embedded reflector patch 293 beneath the channel may affect the electric and magnetic fields, as illustrated.

Figure 3A:
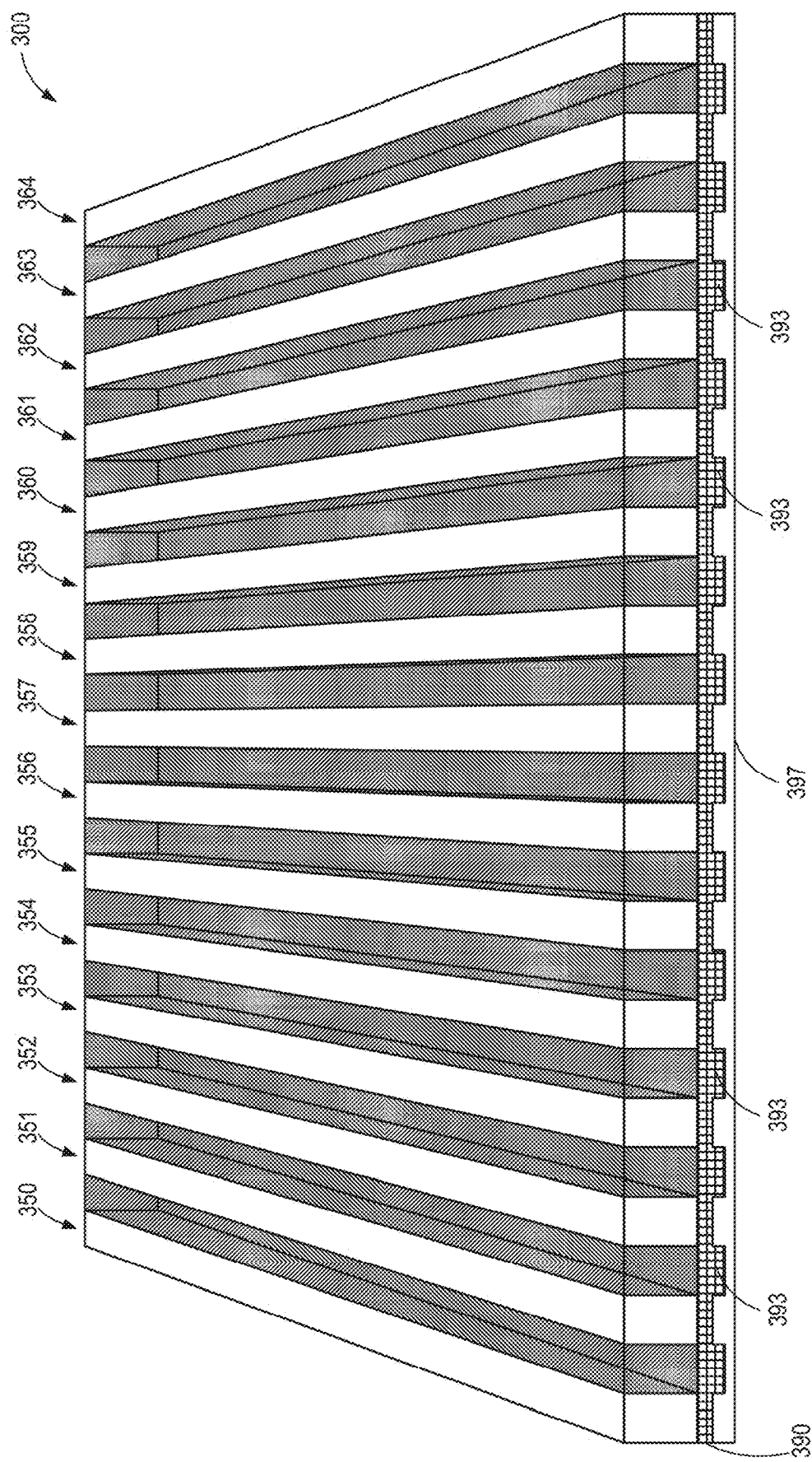
FIG. 3A illustrates a simplified embodiment of an optical surface scattering antenna device with a notched reflector beneath each of the adjustable plasmonic resonant waveguides.

FIG. 3A illustrates another alternative, simplified embodiment of an optical surface scattering antenna device 300 with a plurality of elongated, plasmonic metal rails 350-364 forming channels within which an electrically-adjustable dielectric is disposed. The surface from which the elongated metal rails 350-364 extends includes an insulator 390 and an underlying reflector layer 397. As illustrated, a notch 393 is formed in the reflector layer 397 beneath each channel of the various adjustable plasmonic resonant waveguides. Only some of the notches are labeled to avoid obscuring the drawing. The notches 293 may extend the length of the channels and a have a width corresponding to the width of the one or more channels. In the illustrated embodiment, each notch 293 has a width substantially equal to the width of the channel above it. In other embodiments, the width of each notch 293 may be slightly greater than or slightly less than the width of each channel.

Figure 3B:
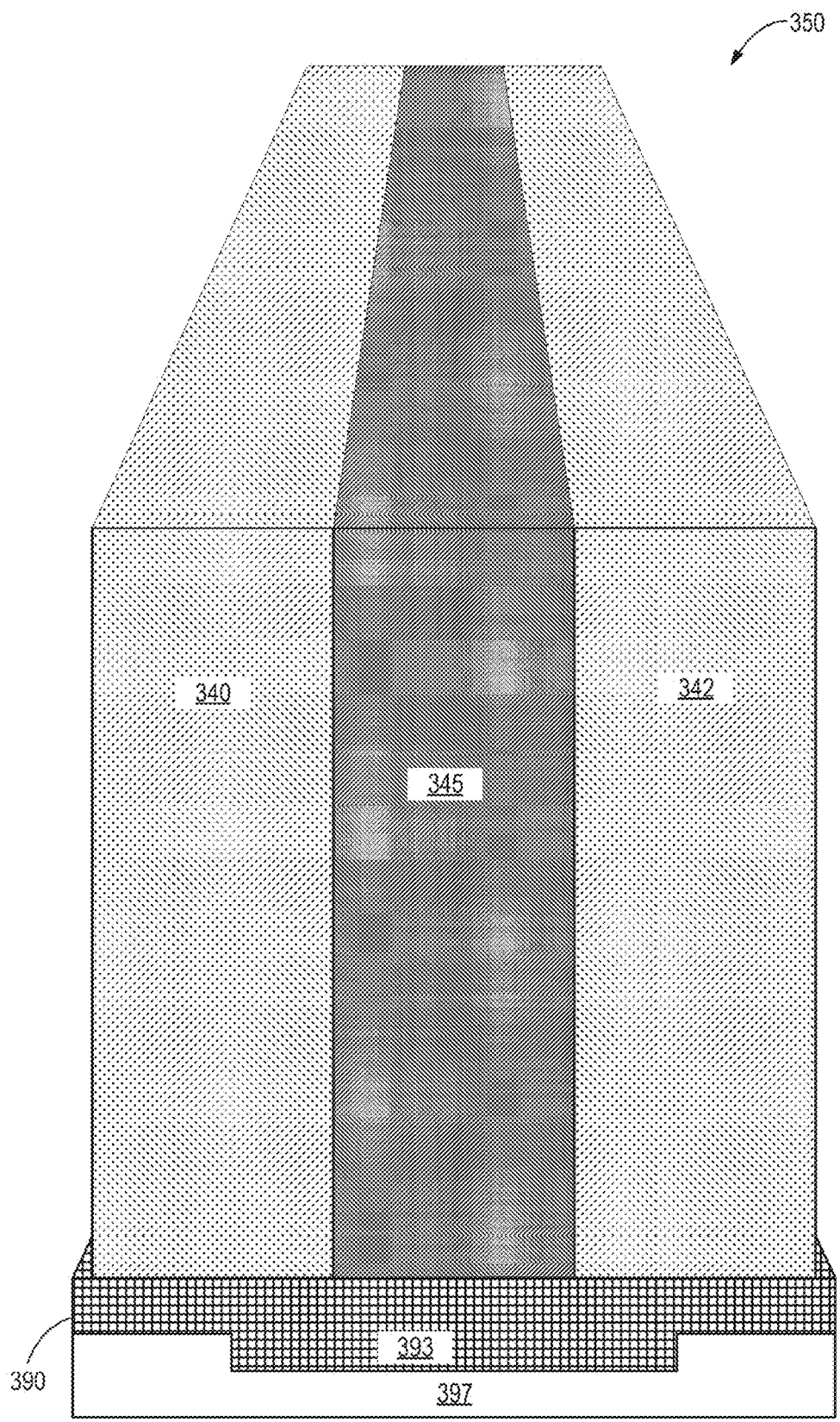
FIG. 3B illustrates an example of single adjustable plasmonic resonant waveguide extending from a surface with an insulator and a notched reflector.

FIG. 3B illustrates an example of single, subwavelength, adjustable plasmonic resonant waveguide 350 extending from a surface that includes an elongated notch 393 in reflector layer 397 separated from the elongated metal rails 340 and 342 by an insulator layer 390. As in previous embodiments, the adjustable plasmonic resonant waveguide 350 comprises a first elongated metal rail 340 and a second, parallel elongated metal rail 342.

In the illustrated embodiment, the notch 393 in the reflector layer 397 has a width slightly greater than the width of the channel within which the electrically-adjustable dielectric 345 is disposed. The first and second metal rails 340 and 342 may comprise one or more combinations of metals that support surface plasmons, such as silver, gold, and/or aluminum, copper, titanium, and/or chromium. As in previously described embodiments, an electrically-adjustable dielectric 345 is disposed within a channel between the first 340 and second 342 metal rails.

Figure 3C:
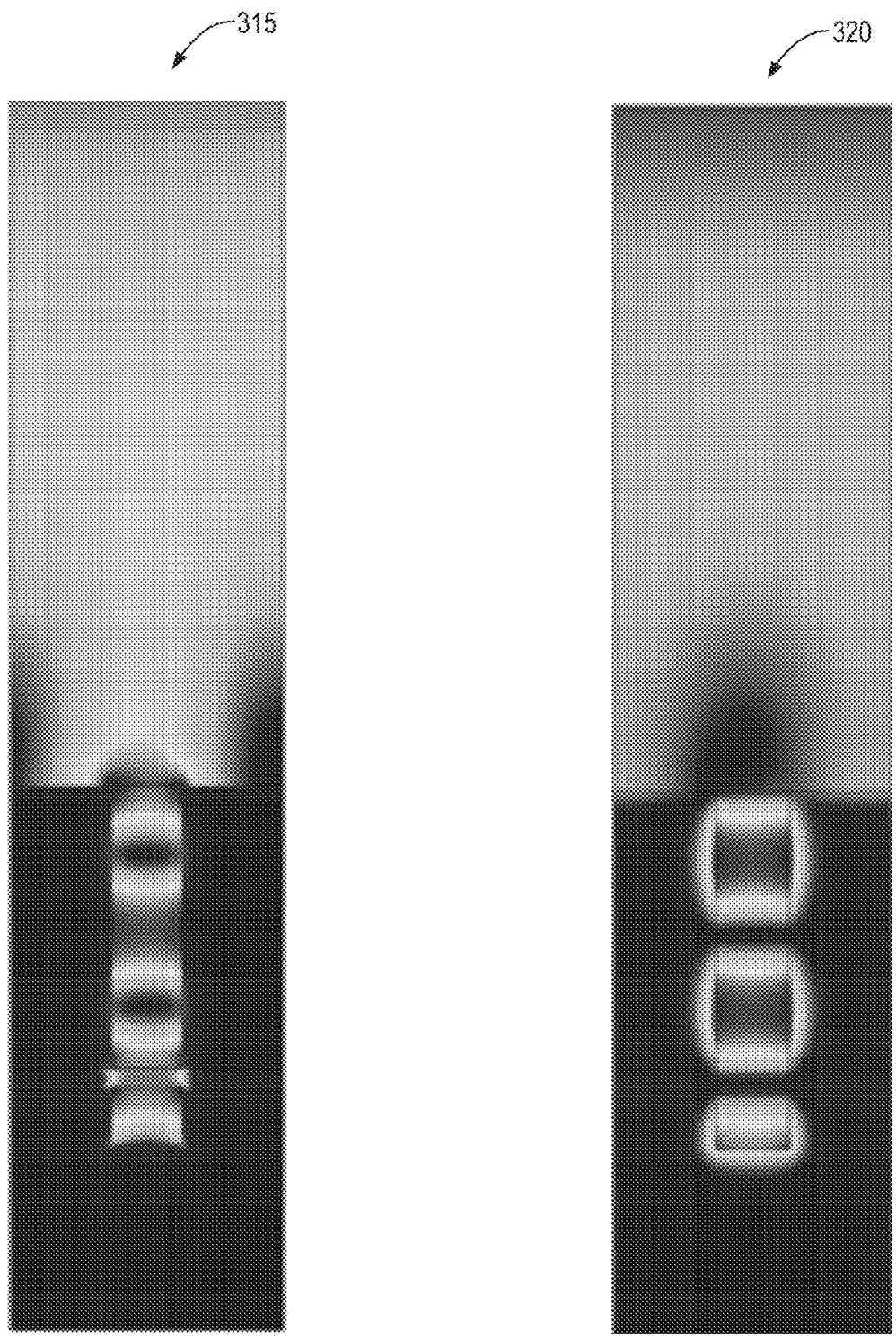
FIG. 3C illustrates conceptual representations of the electric and magnetic energy densities within the adjustable plasmonic resonant waveguide of FIG. 3B.

FIG. 3C illustrates conceptual representations of the electric 315 and magnetic 320 energy densities, respectively, within the adjustable plasmonic resonant waveguide of FIG. 3B with excitation of an optical wavelength at a grazing incidence angle of approximately 70-80° relative to normal with transverse magnetic (TM) polarization. As previously described, the permittivity of the electrically-adjustable dielectric can be dynamically modulated based on the voltage differential applied to the metal rails on either side of the channel. The notch 393 within the underlying reflector layer 393 affects the electric and magnetic field densities as illustrated. The dielectric spacer (e.g., insulator layer 390) can be located at a node of the magnetic field in the plasmonic waveguide to minimize coupling between adjacent waveguides.

Figure 4A:
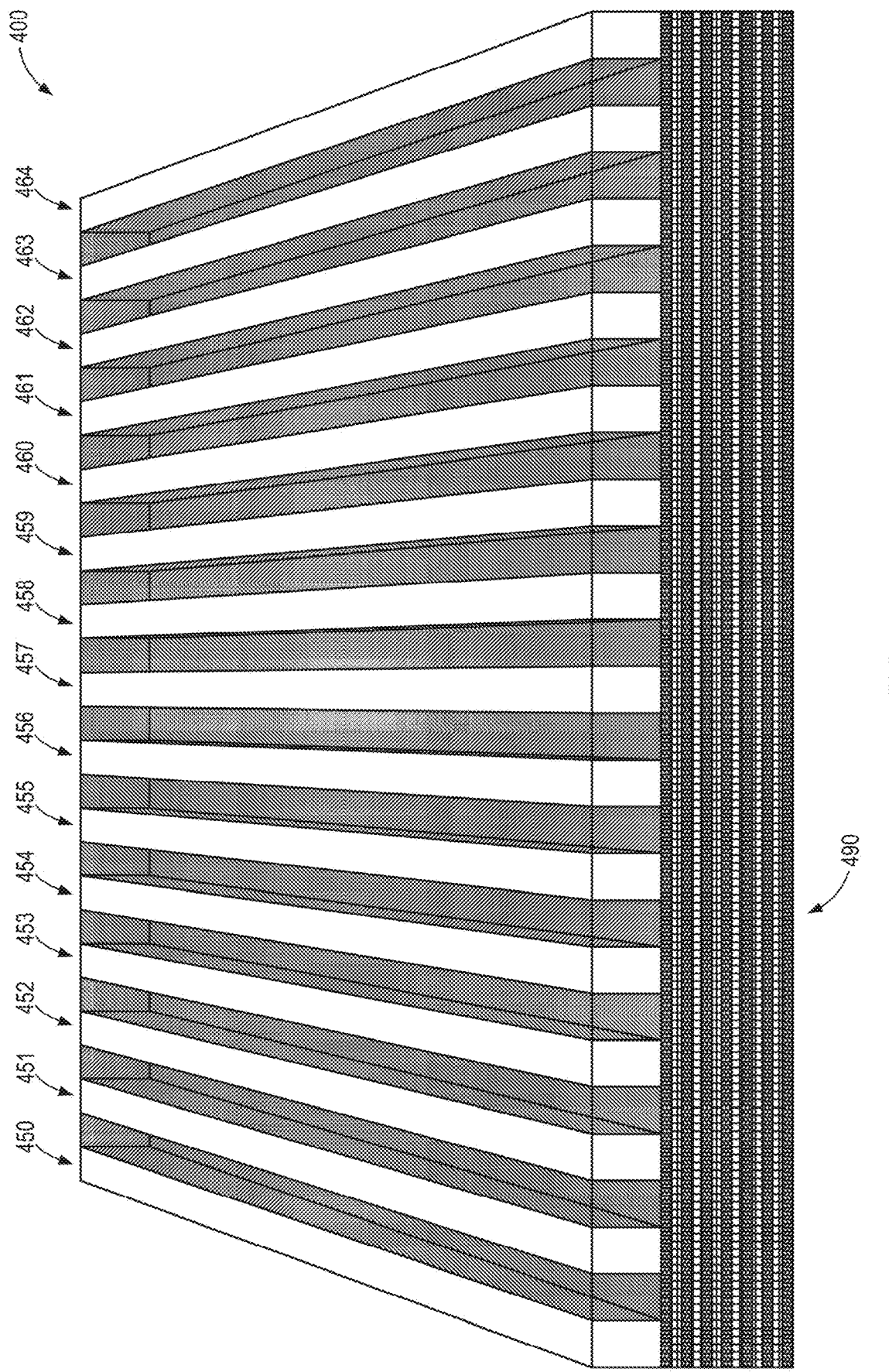
FIG. 4A illustrates a simplified embodiment of an optical surface scattering antenna device with a n underlying Bragg reflector.

FIG. 4A illustrates another alternative embodiment of an optical surface scattering antenna device 400 with a plurality of elongated, plasmonic metal rails 450-464 forming channels within which electrically-adjustable dielectrics are disposed. The surface 490 from which the elongated metal rails 450-464 extends includes alternating layers of dielectrics having low and high indices of refraction (shown as alternating layers of light and dark fill patterns). The alternating layers of dielectrics having low indices of refraction and dielectrics having high indices of refraction creates a Bragg reflector to reflect optical wavelengths within the operational bandwidth of the antenna device 400. In various embodiments, the number of layers may be adjusted (i.e., additional or fewer layers than illustrated) to attain a target reflection efficiency.

Figure 4B:
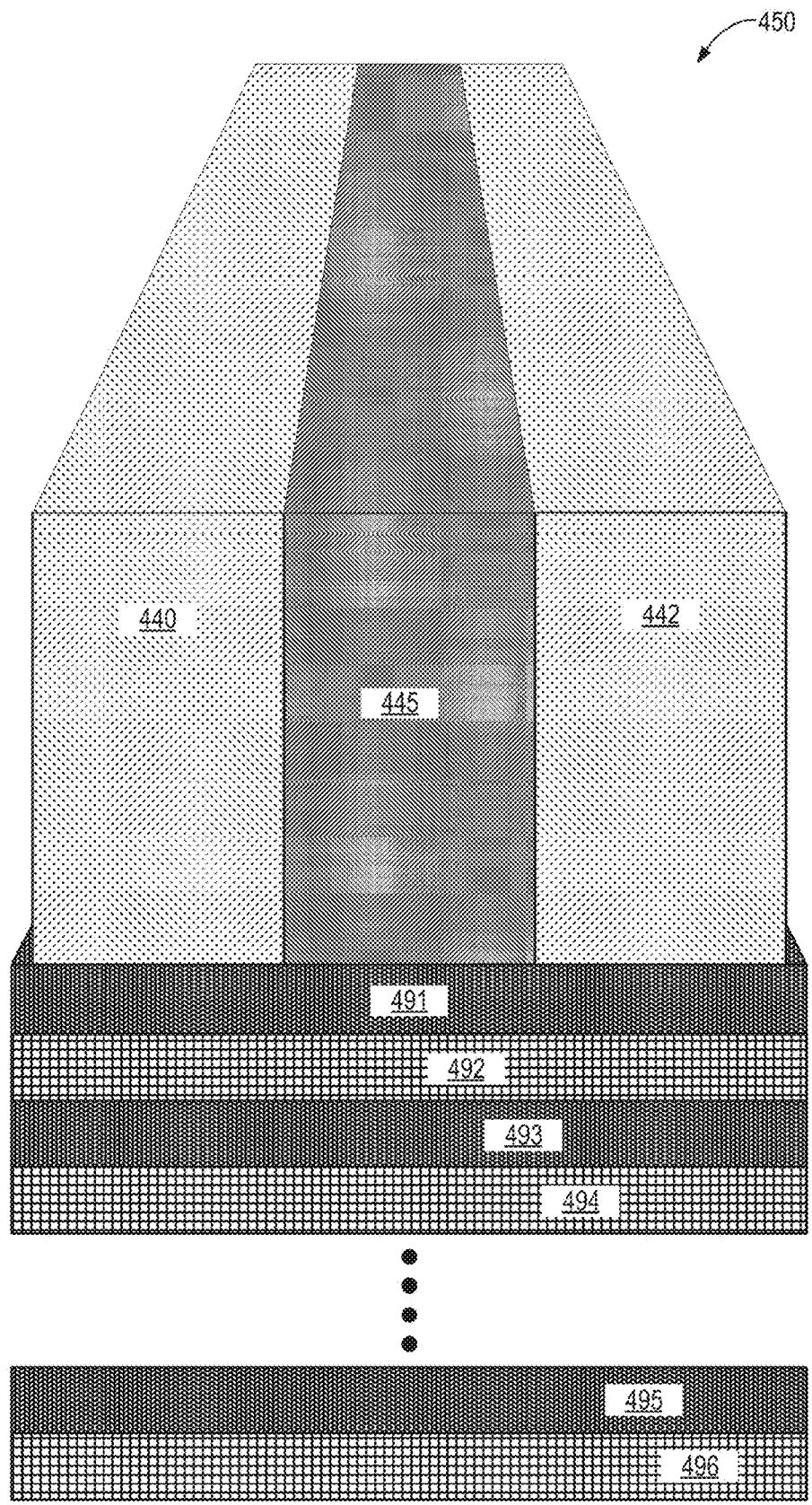
FIG. 4B illustrates an example of single adjustable plasmonic resonant waveguide extending from a Bragg reflector surface.

FIG. 4B illustrates an example of single, subwavelength, adjustable plasmonic resonant waveguide 450 extending from a surface that includes multiple layers of dielectrics. The layered dielectric surface provides a Bragg reflector to reflect optical wavelengths within the operational bandwidth of the antenna and includes dielectrics having a relatively high index of refraction 491, 493, and 495 that may or may not all have the same index of refraction interleaved with dielectrics having a relatively low index of refraction 492, 494, and 496 that also may or may not all have the same index of refraction. The number of layers may vary and dots are shown to illustrate that the number of layers may be much greater than would fit in the illustration. As an example, in one specific embodiment 17 layers are utilized.

As in previous embodiments, the adjustable plasmonic resonant waveguide 450 comprises a first elongated metal rail 440 and a substantially parallel second elongated metal rail 442. An electrically-adjustable dielectric 445 is disposed within a channel therebetween. The first and second metal rails 440 and 442 may comprise one or more combinations of metals that support surface plasmons. An electrical contact may be connected to each metal rail to selectively apply a voltage differential thereto.

Figure 4C:
FIG. 4C illustrates conceptual representations of the electric and magnetic energy densities within the adjustable plasmonic resonant waveguide of FIG. 4B.

FIG. 4C illustrates conceptual representations of the electric 415 and magnetic 420 energy densities, respectively, within the adjustable plasmonic resonant waveguide of FIG. 4B with excitation of an optical wavelength at a grazing incidence angle of approximately 70-80° relative to normal with transverse magnetic (TM) polarization. As previously described, the permittivity of the electrically-adjustable dielectric can be dynamically modulated based on the voltage differential applied to the metal rails on either side of the channel.

Figure 5A:
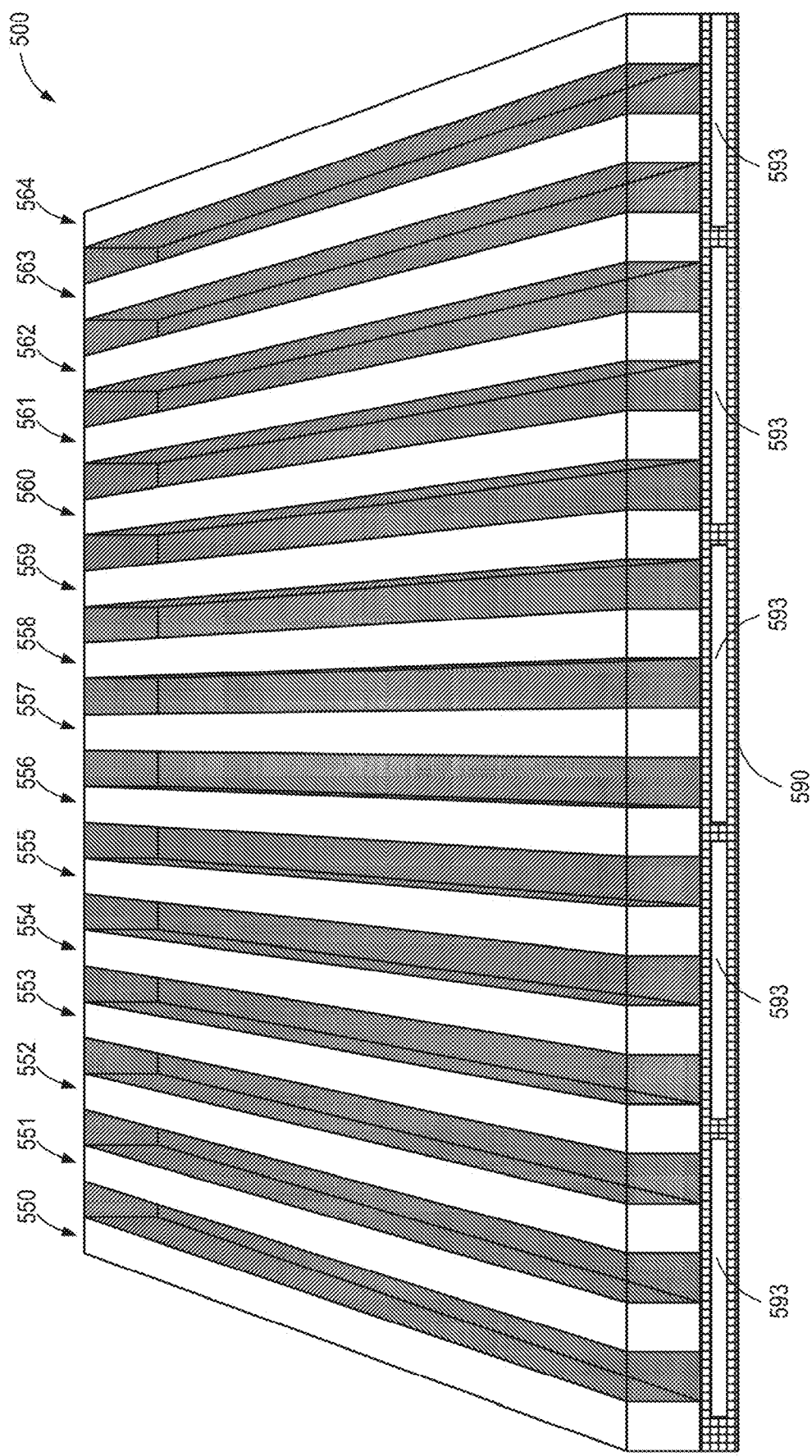
FIG. 5A illustrates a simplified embodiment of an optical surface scattering antenna device with multi-channel width reflector patches beneath each of the adjustable plasmonic resonant waveguides.

FIG. 5A illustrates an alternative, simplified embodiment of an optical surface scattering antenna device 500 with a plurality of elongated, plasmonic metal rails 550-564 forming channels within which an electrically-adjustable dielectric is disposed. The surface from which the elongated metal rails 550-564 extends includes an insulator 590 within which a plurality of reflector patches 593 are embedded. In the illustrated embodiment, a single, elongated reflector patch 593 underlies every three channels of the various adjustable plasmonic resonant waveguides.

The embedded reflector patches 593 may be elongated to run the length of each of the channels between the elongated metal rails 550-564. FIG. 2B illustrates an embodiment in which the width of each embedded reflector patch corresponds to the width of a single channel. Alternative embodiments may include embedded reflector patches that correspond to any number of channels. In some embodiments, the widths of each reflector patch may be varied such that some reflector patches span a single channel, others may span two or three channels, and still others may span even more channels.

Figure 5B:
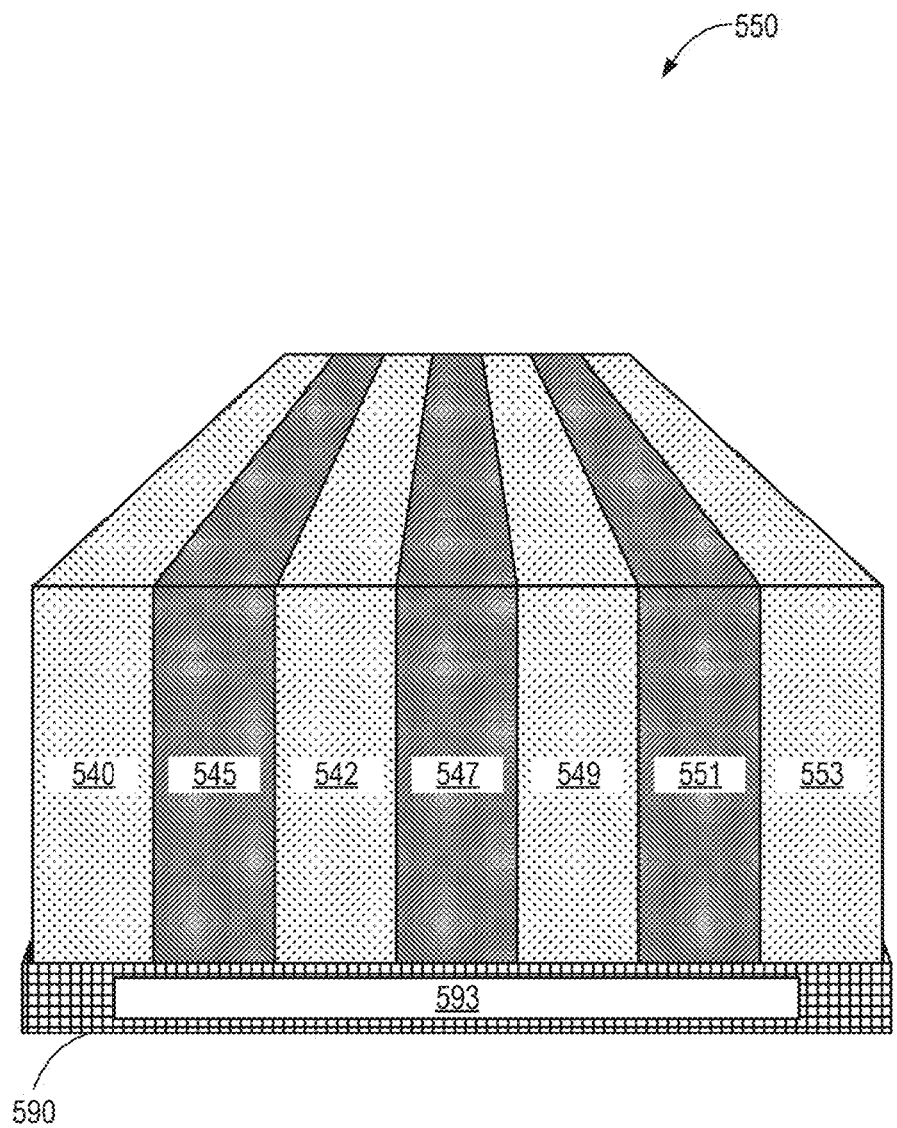
FIG. 5B illustrates an example of single adjustable plasmonic resonant waveguide extending from a surface with an insulator and embedded multi-channel width reflector patches.

FIG. 5B illustrates an example of three, subwavelength, adjustable plasmonic resonant waveguides 550 extending from a surface that includes an elongated optical reflector patch 593 embedded within an insulator 590. The elongated optical reflector patch 593 has a width corresponding to the width of the three adjustable plasmonic resonant waveguides 550. Each of the adjustable plasmonic resonant waveguides 550 comprises an electrically-adjustable dielectric 545, 547, and 551 disposed within a channel between two opposing metal rails 540, 542, 549, and 553.

Figure 6:
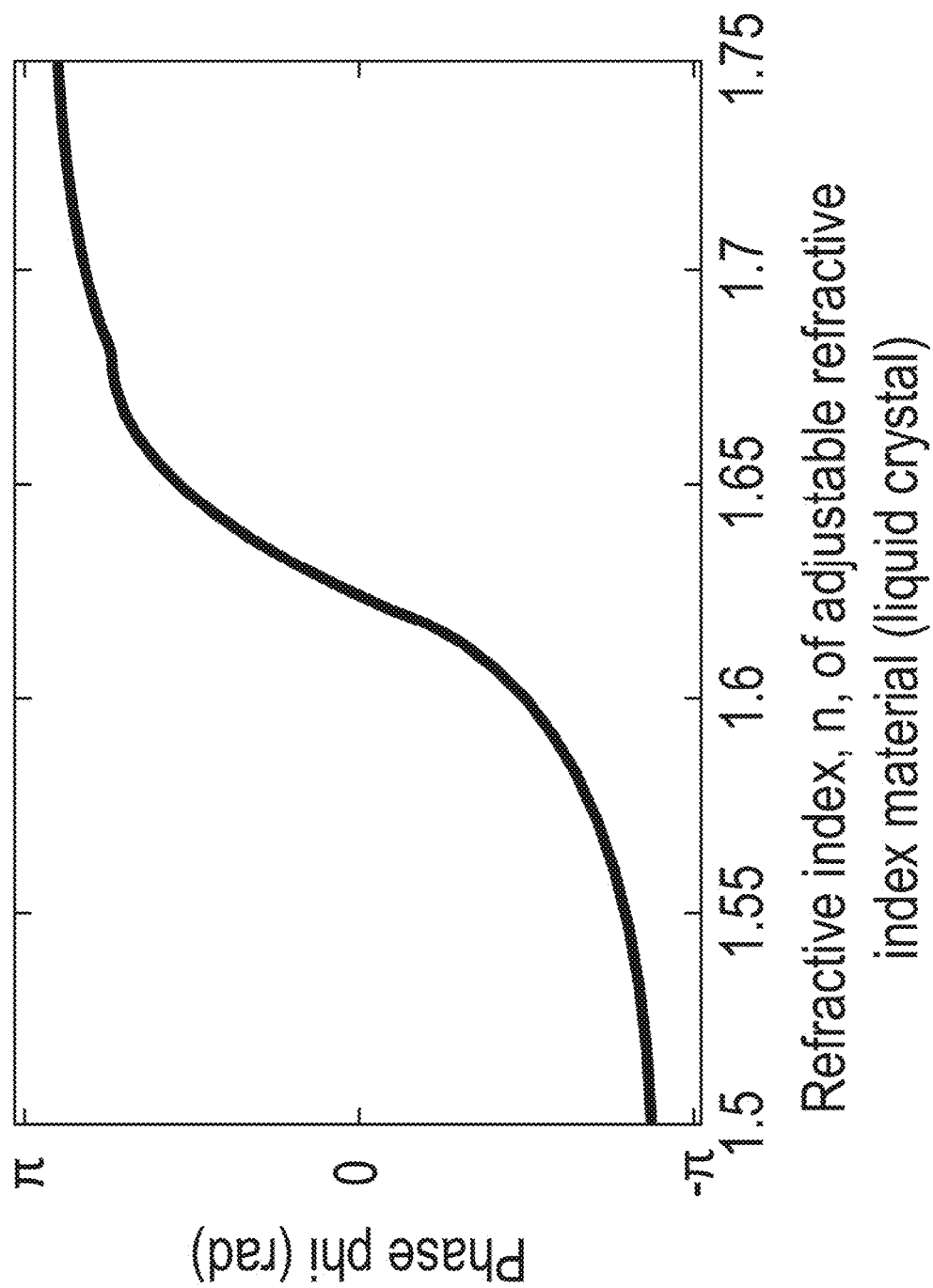
FIG. 6 illustrates an approximation of the reflection phase of one example of a single adjustable plasmonic resonant waveguide as a function of the refractive index of the electrically-adjustable dielectric.

FIG. 6 illustrates an approximation of the effective reflection phase of a single adjustable plasmonic resonant waveguide as a function of refractive index of the electrically-adjustable dielectric. As illustrated, the reflection phase of the adjustable plasmonic resonant waveguide can be varied significantly based on the refractive index of the dielectric. As illustrated, a phase modulation of nearly $2\pi$ is possible with a refractive index modulation of just 7%.

Figure 7:
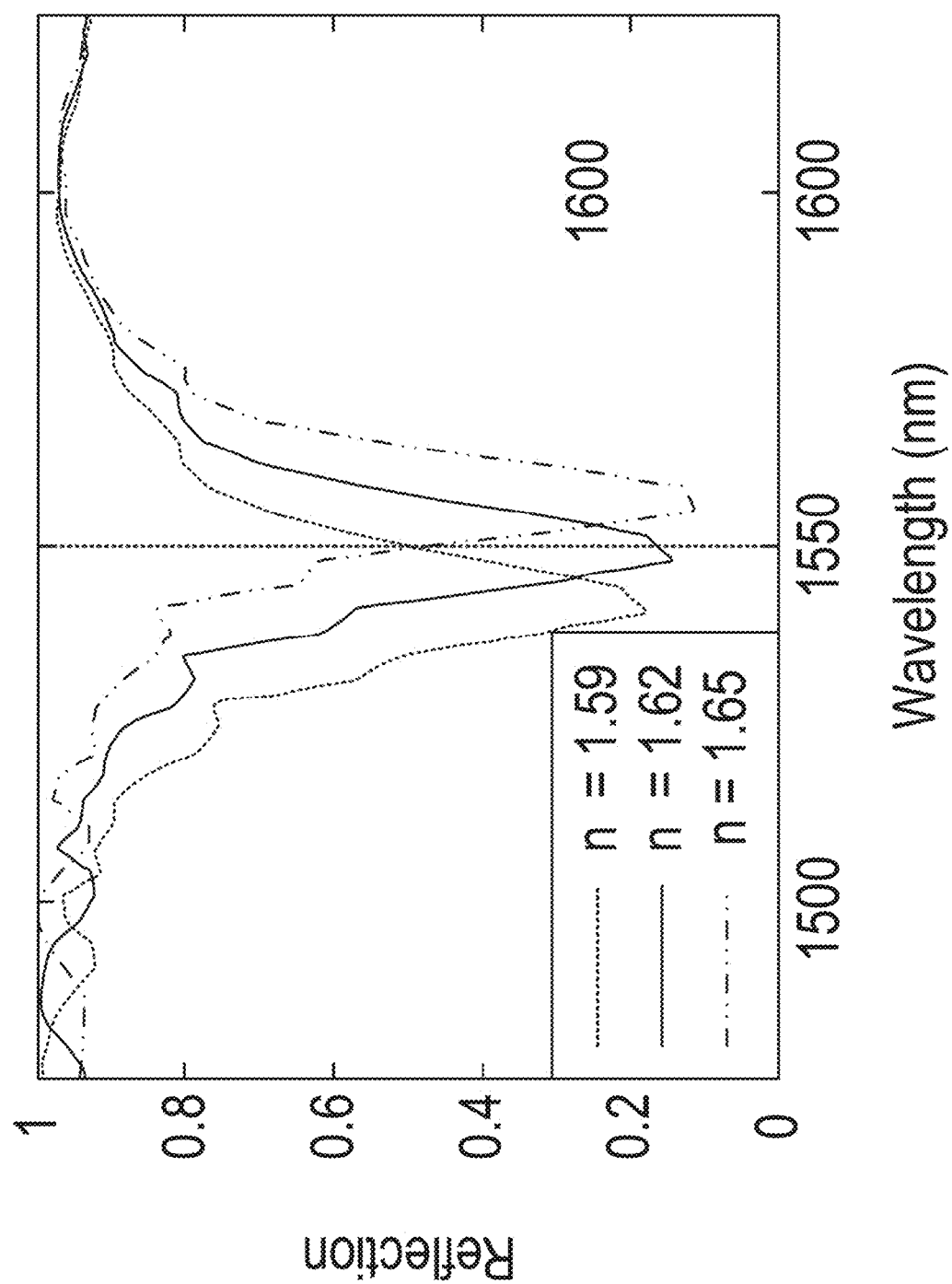
FIG. 7 illustrates an approximation of the reflection spectrum of one example of a high-Q adjustable plasmonic resonant waveguide.

FIG. 7 illustrates an approximation of a reflection spectrum of a high-Q adjustable plasmonic resonant waveguide. This high sensitivity to the refractive index of the dielectric is enabled by the high-Q of the resonance (Q=64) in the illustrated example. The devices described herein exhibit a high sensitivity of the reflection phase to the refractive index of the electrically-adjustable dielectric disposed in the channel between the first and second metal rails. The high sensitivity and the ability to tune or adjust the refractive index of the dielectric facilitates the functionality of the dynamic metasurfaces described herein.

In an illustrative embodiment, the high-Q dielectric resonances are utilized to define a one-dimensional beamforming hologram. The use of a one-dimensional hologram is for convenient illustration only, and other embodiments provide a two-dimensional hologram. In one approach, the hologram phase may be calculated, for example, by using a Gerchberg-Saxton algorithm, while imposing a phase-amplitude constraint in the plane of the hologram due to the Lorentzian resonant nature of the metasurface elements. The calculated phase at each dielectric resonant element is highly correlated with the refractive index of the adjustable refractive index of each dielectric resonant element.

By adjusting the refractive index, a pattern of refractive indices can be attained that corresponds to a specific holograph phase. The refractive index of each dielectric resonant element may be mapped to a specific applied voltage differential. Accordingly, each pattern of applied voltage differentials corresponds to a unique pattern of refractive indices and a corresponding phase holograph.

Figure 8:
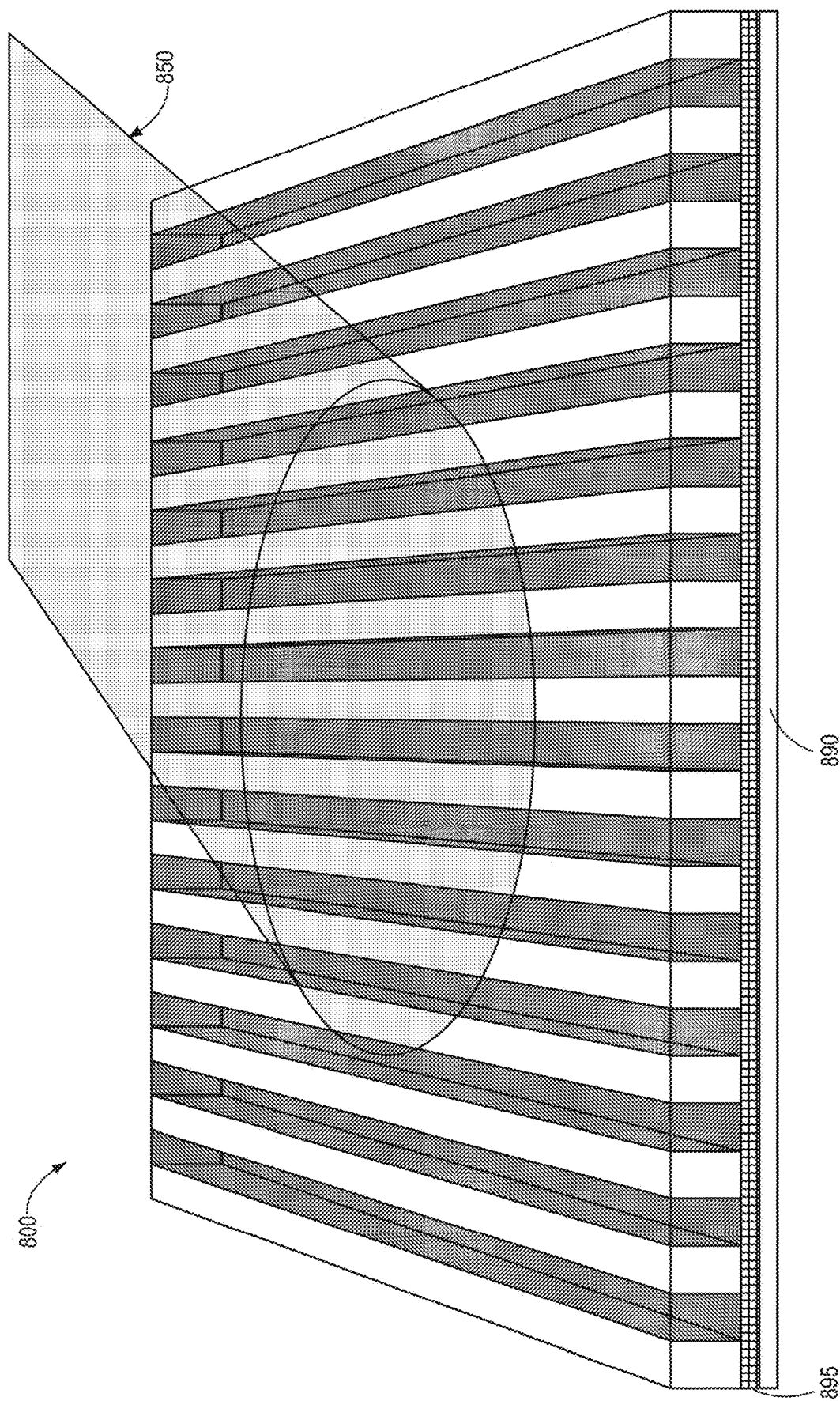
FIG. 8 illustrates a simplified diagram of steerable beam of reflected optical radiation possible via an optical surface scattering antenna similar to the antenna illustrated in FIG. 1A.

FIG. 8 illustrates a simplified diagram of steerable beam 850 of reflected optical radiation possible via an optical surface scattering antenna 800 similar to the antenna illustrated in FIG. 1A. As illustrated, an insulator layer 895 separates the plurality of adjustable plasmonic resonant waveguides from the underlying reflector 890.

Figure 9:
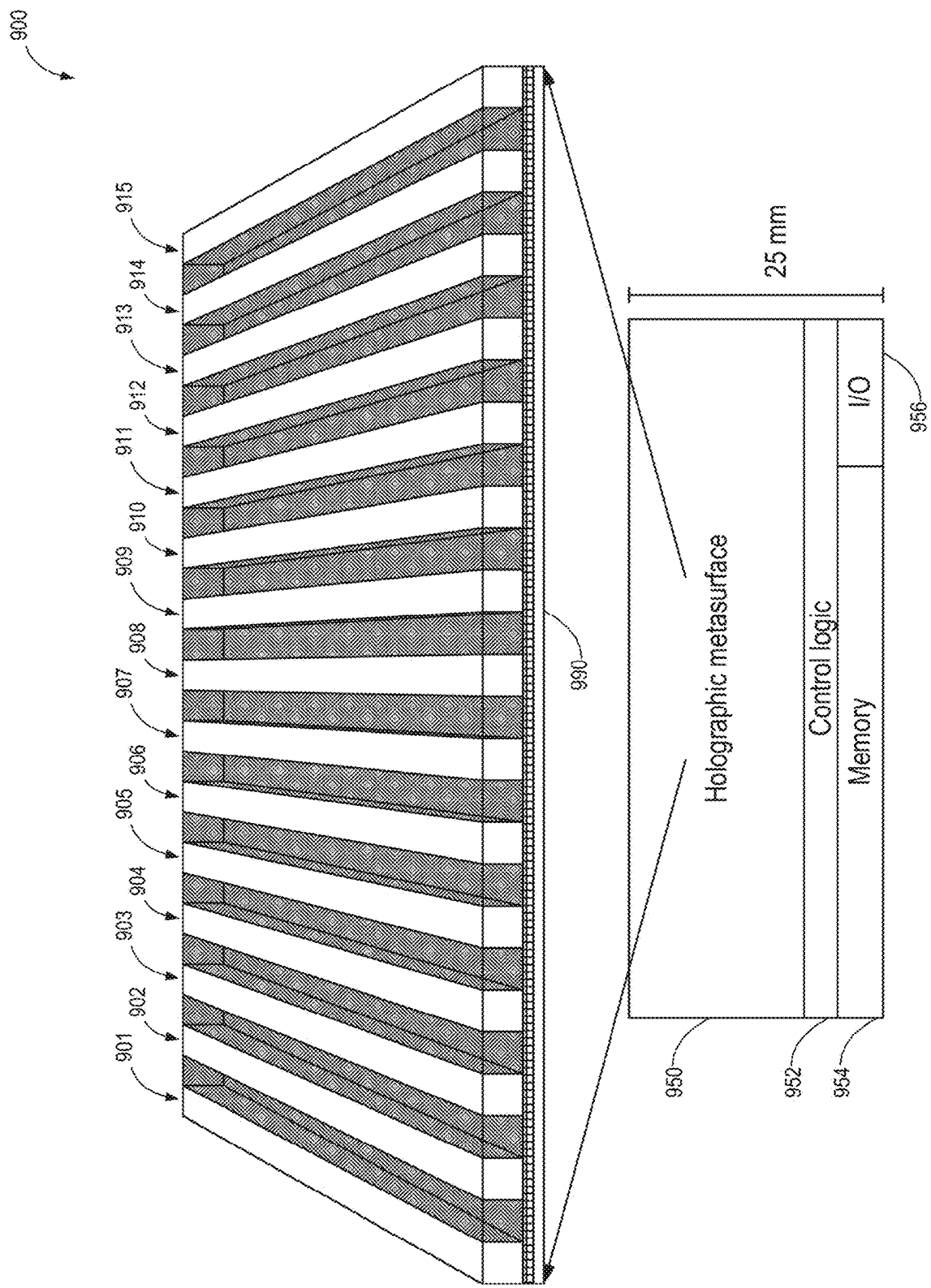
FIG. 9 illustrates a holographic metasurface, control logic, memory, and an input/output port to form a transmit and/or receive optical surface scattering antenna system.

FIG. 9 illustrates a simplified embodiment of an array 900 of 14 adjustable plasmonic resonant waveguides on top of a surface 990 including an insulator and a reflector. While this simplified array 900 shows only 14 adjustable plasmonic resonant waveguides, functional embodiments may include thousands, tens of thousands, hundreds of thousands, or even millions of adjustable plasmonic resonant waveguides in a one-dimensional array as illustrated or organized in various rows and columns. For example, an antenna that is 3 centimeters wide may include tens of thousands of adjustable plasmonic resonant waveguides (e.g., approximately 90,000 for 350-nanometer devices). Larger antennas may include a proportionally larger number of adjustable plasmonic resonant waveguides depending on the feature sizes for a given operational bandwidth. In the illustrated embodiment, each of the metal rails 902-914 is shared by two adjustable plasmonic resonant waveguides, while the two end metal rails 901 and 915 are not shared.

Each of the metal rails 901-915 may be connected to an electrical lead to provide a specific voltage value and thereby induce a desired electric field within the electrically-adjustable dielectrics disposed within the channels formed between each pair of adjacent metal rails 910-915. In some embodiments, the voltage values applied from one end to the other are continuously increasing.

For example, assuming a voltage differential up to 1.5 volts is desired between each adjacent set of metal rails, then for the illustrated embodiment that includes 15 metal rails 901-915, a voltage range from −10 volts at one end (metal rail 901) to +11 volts at the other end (metal rail 915) would be sufficient. In some embodiments, a 1.5 voltage differential may not provide a sufficient range of adjustability and a higher voltage differential between adjacent metal rails may be utilized. In other embodiments, 1.5 volts may provide a greater range than needed and so a lower voltage differential may be employed. In embodiments in which tens, thousands, or even tens of thousands of metals rails are employed, a voltage pattern may be repeated numerous times. For example, 10 metal rails may utilize a voltage rage from −5 volts to +5 volts. Adjacent metal rails at the beginning and end of each set of 10 metal rails may see a voltage differential of the full 10 volts and may or may not function in the same manner as the other adjustable plasmonic resonant waveguides that experience the "normal" voltage differentials. In embodiments in which liquid crystals are the electrically adjustable material, a smaller voltage range may be sufficient, since liquid crystals respond only to the magnitude of the electric field.

As illustrated, the plurality of adjustable plasmonic resonant waveguides 900 may constitute a holographic metasurface 950. Control logic 952, memory 954, and an input/output port 956 may be paired with the holographic metasurface 950 to form a transmit and/or receive optical surface scattering antenna system. In other embodiments, the control electronics for the plasmonic waveguides may be located on a separate chip and connected to the metasurface chip via wirebonds, wirelessly, or via other interconnect methods.

The control logic may provide voltage signals to each dielectric member to create an electric field within the electrically-adjustable dielectric between each of the metal rails 901-915. A pattern of voltage differentials may be generated by the control logic to attain a specific pattern of refractive indices that corresponds to a target reflection pattern of the optical surface scattering antenna system.

Figure 10:
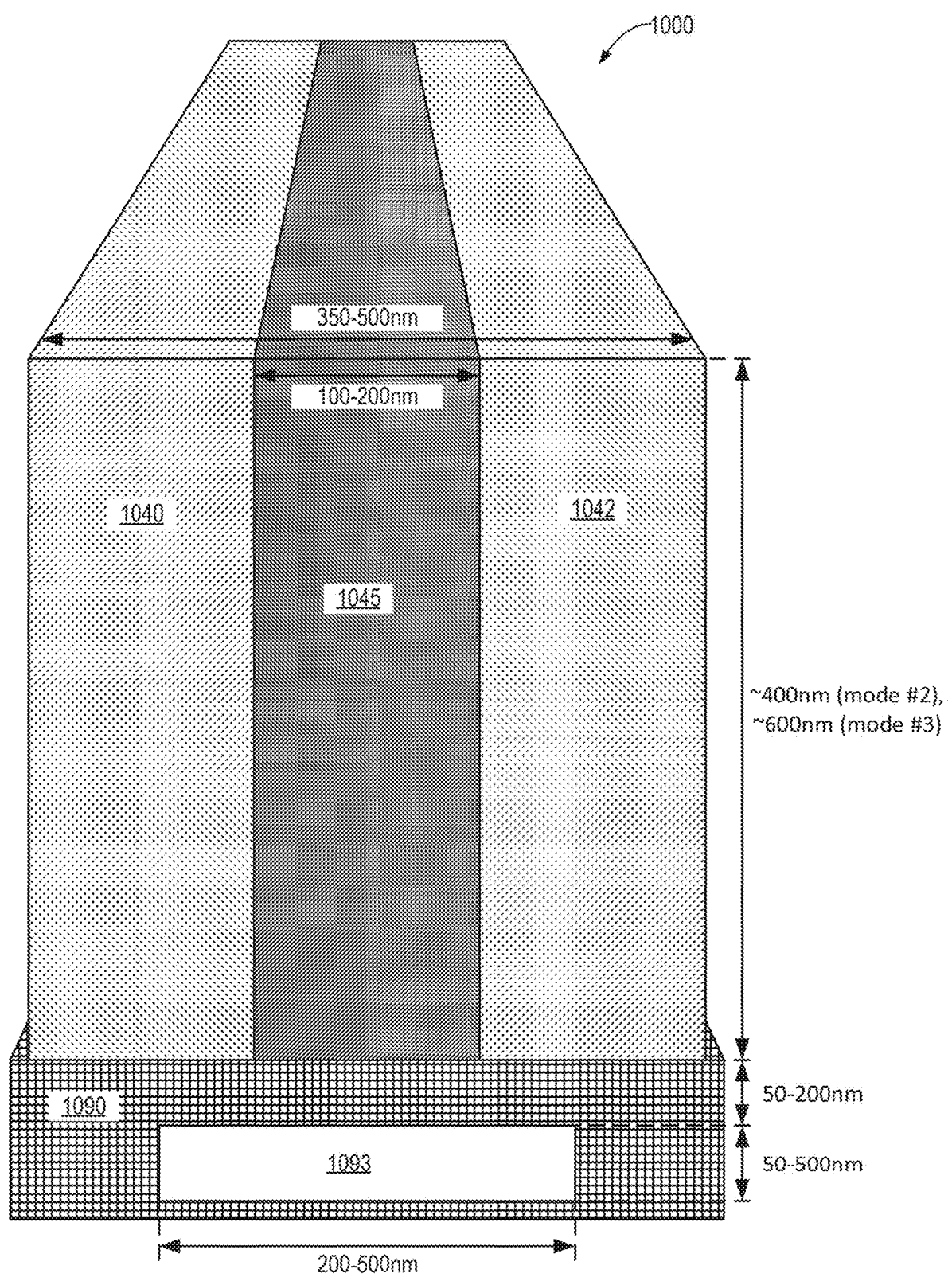
FIG. 10 illustrates an example of an adjustable plasmonic resonant waveguide with example dimensions for a particular operational bandwidth.

FIG. 10 illustrates a specific example of an adjustable plasmonic resonant waveguide 1000 configured to operate in a relatively narrow bandwidth that includes infrared light at 905 nanometers. In the specific embodiment, the adjustable plasmonic resonant waveguide 1000 includes two opposing metal rails 1040 and 1042 forming a channel therebetween. An electrically-adjustable dielectric 1045 is disposed within the channel. The surface from which the adjustable plasmonic resonant waveguide 1000 extends includes an elongated reflector patch 1093 embedded within an insulator 1090.

In the illustrated embodiment, the metal rails 1040 and 1042 may extend from the surface between approximately 400 and 600 nanometers depending on the mode of operation (i.e., the number of magnetic field antinodes achievable along the height of the channel). The channel width may be between approximately 100 and 200 nanometers. The combined width of the metal rails 1040 and 1042 and the channel 1045 may be between approximately 350 and 500 nanometers. One or both of the metal rails 1040 and 1042 may be shared by an adjacent adjustable plasmonic resonant waveguide so the effective pitch of the elements may be slightly less than the approximately 350- to 500-nanometer combined width.

The reflective patch 1093 may be embedded within the insulator 1090 by a depth of between 50 and 200 nanometers and may itself have a thickness of between 50 and 500 nanometers. The width of the reflective patch 1093 may be at least as wide as the channel or slightly wider than the channel with a width of between approximately 200 and 500 nanometers.

Figure 11A:
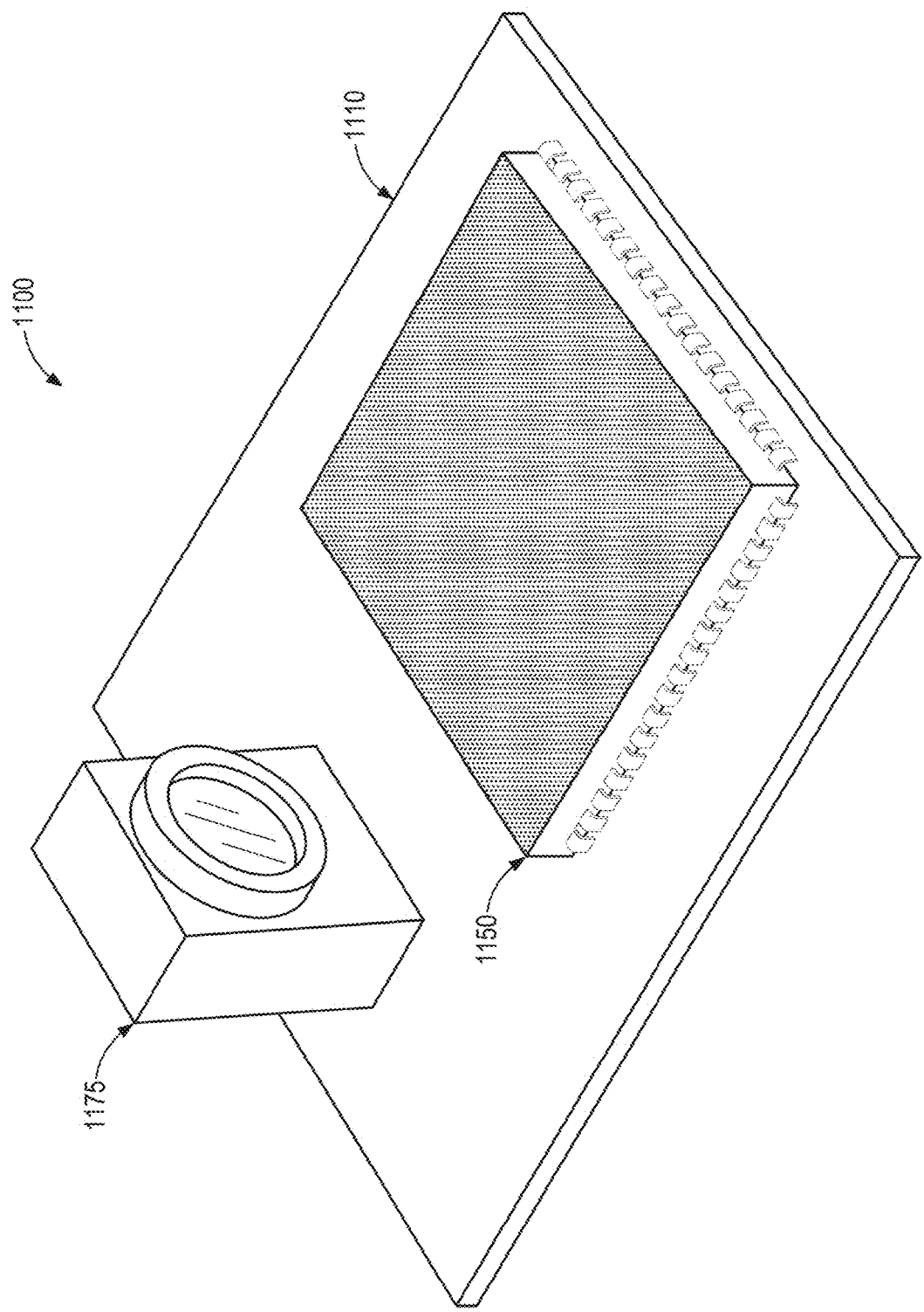
FIG. 11A illustrates an example of a tunable optical surface scattering antenna device with an optical transmitter or receiver.

FIG. 11A illustrates an example of a system 1100 that includes a tunable optical surface scattering antenna device 1150 with an optical transmitter and/or receiver 1175 mounted to a base 1110. The optical transmitter and/or receiver 1175 may be configured to transmit optical radiation to and/or receive optical radiation from the tunable optical surface scattering antenna device 1150 at a grazing angle of incidence (e.g., between 60 and 89 degrees). The tunable optical surface scattering antenna device 1150 may be configured according to any combination of embodiments described herein that employ adjustable plasmonic resonant waveguides extending from a surface that is or includes a reflector.

For instance, the tunable optical surface scattering antenna device 1150 may be configured with a plurality of elongated adjustable plasmonic resonant waveguides. The adjustable plasmonic resonant waveguides may comprise a one-dimensional array of parallel, elongated metal rails with channels formed therebetween. Electrically-adjustable dielectrics may be disposed within the channels to provide a metal-dielectric interface the supports plasmonic transmission at wavelengths within the operational bandwidth.

Figure 11B:
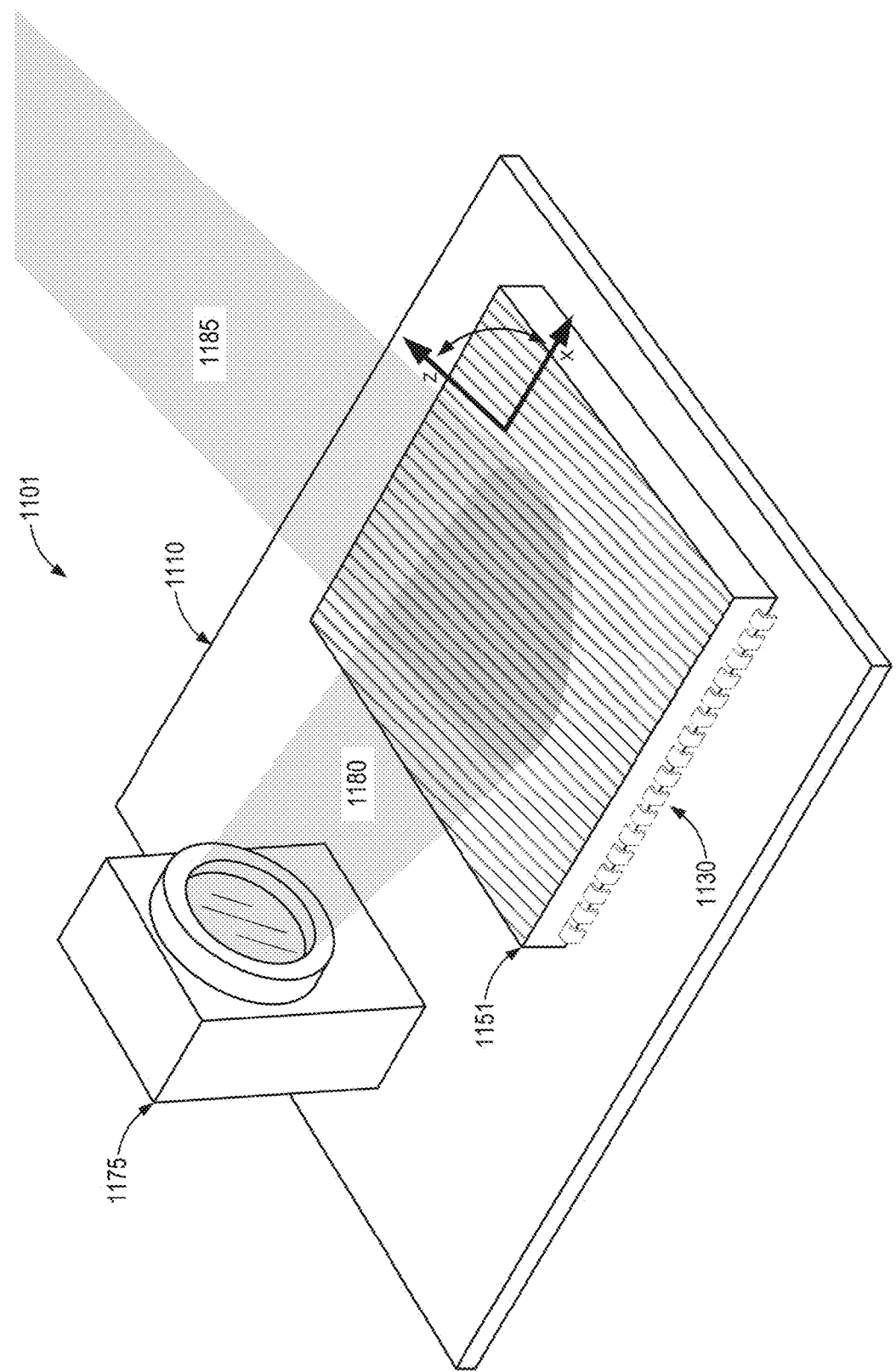
FIG. 11B illustrates the transmitter (or receiver) transmitting (or receiving) optical radiation via a steerable optical beam from the tunable optical surface that includes adjustable plasmonic resonant waveguides.

FIG. 11B illustrates the transmitter 1175 (or receiver) transmitting (or receiving) optical radiation 1180 at a grazing angle via a reflected, steerable optical beam 1185 from the tunable optical surface 1151 that includes elongated wall dielectric members. The beam 1185 may be adjusted in one direction as shown by the X-Z arrows. Electrical contacts 1130 are illustrated to represent potential pinouts for applying a voltage differential to each of the plurality of metal rails within the tunable optical surface 1151. In some embodiments, many more pinouts may be available (as in FIG. 11A) and/or multiple metal rails may be connected to the same pinout.

Figure 12:
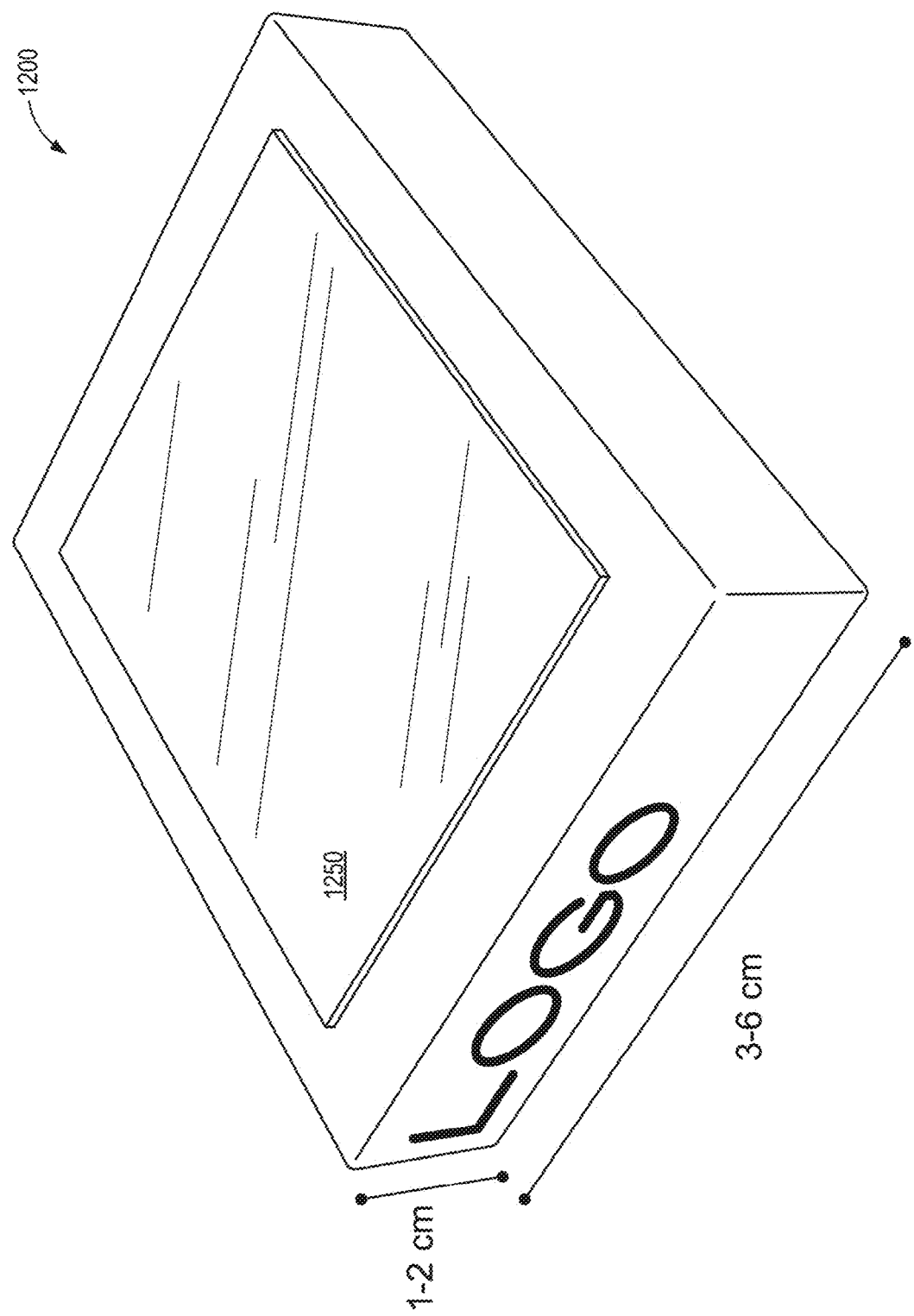
FIG. 12 illustrates an example embodiment of a packaged solid-state steerable optical beam antenna system with an optically transparent window.

FIG. 12 illustrates an example embodiment of a packaged solid-state steerable optical beam antenna system 1200 with an optically transparent window 1250. The illustrated embodiment may include a transmitter, receiver, and/or a transceiver within the package that are in optical communication with one or more tunable optical surface scattering antenna devices. For example, a transceiver may be paired with a single tunable optical surface scattering antenna device. Alternatively, the package may include a discrete transmitter and a discrete receiver that are each in communication with their own tunable optical surface scattering antenna device—one for receiving and one for transmitting. The package may protect the sensitive components and the optically transparent window 1250 may allow for a steerable beam to be steered at various angles.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the following claims.

What is claimed is:

1. A phase-adjustable subwavelength resonant element, comprising:
   a surface;
   a first plasmonic metal rail extending from the surface;
   a second plasmonic metal rail extending from the surface, wherein the first and second plasmonic metal rails are spaced from one another to form a channel therebetween;
   an electrically-adjustable dielectric disposed within at least a portion of the channel; and
   electrical contacts to receive an applied voltage differential to the first and second plasmonic metal rails,
      wherein application of a first voltage differential to the first and second plasmonic metal rails corresponds to a first reflection phase of the subwavelength resonant element, and wherein application of a second voltage differential to the first and second plasmonic metal rails corresponds to a second reflection phase of the subwavelength resonant element.

2. The subwavelength resonant element of claim 1, wherein the surface comprises an optical reflector to reflect optical electromagnetic radiation within an operational bandwidth of the subwavelength resonant element.

3. The subwavelength resonant element of claim 2, wherein the optical reflector comprises a Bragg reflector comprising alternating low and high index dielectric materials.

4. The subwavelength resonant element of claim 2, wherein the optical reflector comprises an electrically conductive reflector.

5. The subwavelength resonant element of claim 4, wherein the electrically conductive reflector comprises copper.

6. The subwavelength resonant element of claim 4, further comprising an insulator separating the plasmonic metal rails from the electrically conductive reflector.

7. The subwavelength resonant element of claim 6, wherein the insulator comprises a dielectric insulator layer.

8. The subwavelength resonant element of claim 7, wherein the dielectric insulator layer comprises silicon dioxide.

9. The subwavelength resonant element of claim 7, wherein the dielectric insulator layer comprises a nitride-based dielectric.

10. The subwavelength resonant element of claim 7, wherein the dielectric insulator layer has a thickness of between 25 and 300 nanometers.

11. The subwavelength resonant element of claim 4, wherein the electrically conductive reflector comprises a layer of metal.

12. The subwavelength resonant element of claim 11, wherein the layer of metal is notched beneath the electrically-adjustable dielectric within the channel.

13. The subwavelength resonant element of claim 1, wherein an operational bandwidth includes a 905-nanometer wavelength and each of the plasmonic metal rails extends from the surface to a height of approximately 400 nanometers.

14. The subwavelength resonant element of claim 1, wherein an operational bandwidth includes a 905-nanometer wavelength and each of the plasmonic metal rails extends from the surface to a height of approximately 600 nanometers.

15. The subwavelength resonant element of claim 1, wherein an operational bandwidth includes a 905-nanometer wavelength, and
    wherein the first and second plasmonic metal rails are spaced from one another by a channel width of between approximately 100 and 250 nanometers.

16. The subwavelength resonant element of claim 1, wherein the channel between the first and second plasmonic metal rails corresponds to a fundamental harmonic mode of frequencies within an optical operating bandwidth of the subwavelength resonant element.

17. The subwavelength resonant element of claim 16, wherein each of the plasmonic metal rails extends from the surface to a height corresponding to the fundamental harmonic mode of frequencies within the optical operating bandwidth.

18. The subwavelength resonant element of claim 16, wherein each of the plasmonic metal rails extends from the surface to a height corresponding to a second order harmonic mode of frequencies within the optical operating bandwidth, such that two magnetic field antinodes can be realized within the channel between the surface and tops of the plasmonic metal rails.

19. The subwavelength resonant element of claim 1, wherein the channel between the two plasmonic metal rails corresponds to a second order harmonic mode of frequencies within an optical operating bandwidth of the subwavelength resonant element, such that two magnetic field antinodes can be realized within the electrically-adjustable dielectric in the channel between the plasmonic metal rails.

20. The subwavelength resonant element of claim 19, wherein each of the plasmonic metal rails extends from the surface to a height corresponding to a fundamental harmonic mode of frequencies within the optical operating bandwidth.

21. The subwavelength resonant element of claim 19, wherein each of the plasmonic metal rails extends from the surface to a height corresponding to the second order harmonic mode of frequencies within the optical operating bandwidth, such that two magnetic field antinodes can be realized within the channel between the surface and tops of the plasmonic metal rails.

22. The subwavelength resonant element of claim 1, wherein each of the plasmonic metal rails extends from the surface to a height corresponding to a fundamental harmonic mode of frequencies within an optical operating bandwidth of the subwavelength resonant element.

23. The subwavelength resonant element of claim 1, wherein each of the plasmonic metal rails extends from the surface to a height corresponding to a second order harmonic mode of frequencies within an optical operating bandwidth of the subwavelength resonant element, such that two magnetic field antinodes can be realized within the channel between the surface and tops of the plasmonic metal rails.

24. The subwavelength resonant element of claim 1, wherein each of the plasmonic metal rails extends from the surface to a height corresponding to an Nth order harmonic mode of frequencies within an optical operating bandwidth of the subwavelength resonant element, such that N magnetic field antinodes can be realized within the channel between the surface and tops of the plasmonic metal rails.

25. The subwavelength resonant element of claim 24, wherein a width of the channel between the plasmonic metal rails corresponds to a fundamental harmonic mode of a frequency within the optical operating bandwidth.

26. The subwavelength resonant element of claim 24, wherein a width of the channel between the plasmonic metal rails corresponds to a second order harmonic mode of a frequency within the optical operating bandwidth, such that two magnetic field antinodes can be realized within the electrically-adjustable dielectric.

27. A phase-adjustable subwavelength resonant element, comprising:
    a surface;
    a first rail extending from the surface;
    a second rail extending from the surface,
        wherein the first and second rails are spaced from one another to form a channel therebetween;
    an electrically-adjustable dielectric disposed within at least a portion of the channel; and
    electrical contacts to receive an applied voltage differential to the first and second rails,
        wherein application of a first voltage differential to the first and second rails corresponds to a first reflection phase of the subwavelength resonant element, and wherein application of a second voltage differential to the first and second rails corresponds to a second reflection phase of the subwavelength resonant element.

28. The subwavelength resonant element of claim 27, further comprising a controller to selectively apply a voltage differential to the first and second metal rails corresponding to a reflection phase.

29. The subwavelength resonant element of claim 28, wherein the controller selectively applies the voltage differential to the first and second rails by applying a voltage to one of the rail while the other rail is connected to ground.

30. The subwavelength resonant element of claim 28, wherein the electrically-adjustable dielectric comprises liquid crystal.

31. The subwavelength resonant element of claim 27, wherein an operational bandwidth of the subwavelength resonant element comprises a portion of the visible light spectrum.

32. The subwavelength resonant element of claim 27, wherein an operational bandwidth of the subwavelength resonant element comprises a portion of the infrared light spectrum.

33. The subwavelength resonant element of claim 27, wherein an operational bandwidth of the subwavelength resonant element comprises a telecommunications wavelength.

34. A phase-adjustable subwavelength resonant element, comprising:
   a surface;
   a first rail extending from the surface;
   a second rail extending from the surface,
      wherein the first and second rails are spaced from one another to form a channel therebetween;
   an electrically-adjustable dielectric disposed within at least a portion of the channel; and
   a controller to apply voltage differential to the first and second rails,
      wherein application of a first voltage differential to the first and second rails corresponds to a first reflection phase of the subwavelength resonant element, and
      wherein application of a second voltage differential to the first and second rails corresponds to a second reflection phase of the subwavelength resonant element.

35. The subwavelength resonant element of claim 34, wherein the first and second rails are each elongated to a length corresponding to an Nth harmonic mode of a frequency within an optical operating bandwidth of the subwavelength resonant element, such that N magnetic field antinodes can be realized along the length of the channel between the first and second rails, where N is a numerical value.

36. The subwavelength resonant element of claim 35 wherein each of the first and second rails extends from the surface to a height corresponding to an Mth order harmonic mode of frequencies within the optical operating bandwidth, such that M magnetic field antinodes can be realized within the channel between the surface and tops of the first and second rails, where M is a numerical value.

37. The subwavelength resonant element of claim 36, wherein M is equal to N.

38. The subwavelength resonant element of claim 36, wherein M less than N.

39. The subwavelength resonant element of claim 36, wherein a width of the channel between the first and second rails corresponds to a fundamental harmonic mode of frequencies within the optical operating bandwidth.

40. The subwavelength resonant element of claim 36, wherein a width of the channel between the first and second rails corresponds to a second order harmonic mode of frequencies within the optical operating bandwidth, such that two magnetic field antinodes can be realized within the electrically-adjustable dielectric between the plasmonic metal rails.

41. The subwavelength resonant element of claim 36, wherein a width of the channel between the first and second rails corresponds to a third order harmonic mode of frequencies within the optical operating bandwidth, such that three magnetic field antinodes can be realized within the electrically-adjustable dielectric between the first and second rails.

42. The subwavelength resonant element of claim 34, wherein each of the first and second rails extends substantially perpendicular from the surface.

43. The subwavelength resonant element of claim 34, wherein each of the first and second rails extends at an angle from the surface.

* * * * *